(12) United States Patent
Morys et al.

(10) Patent No.: US 6,518,756 B1
(45) Date of Patent: Feb. 11, 2003

(54) SYSTEMS AND METHODS FOR DETERMINING MOTION TOOL PARAMETERS IN BOREHOLE LOGGING

(75) Inventors: Marian Morys, Downington, PA (US); George D. Goodman, Phoenixville, PA (US); Manfred G. Prammer, Downington, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/882,228

(22) Filed: Jun. 14, 2001

(51) Int. Cl.$^7$ .................................................. G01V 3/00
(52) U.S. Cl. ...................................... 324/303; 324/300
(58) Field of Search .............................. 324/303, 300, 324/307, 309, 310, 311, 322

(56) References Cited

U.S. PATENT DOCUMENTS

| | | | |
|---|---|---|---|
| 2,973,471 A | 2/1961 | Armistead et al. | |
| 3,205,477 A | 9/1965 | Kalbfell | |
| 3,360,716 A | 12/1967 | Bloom et al. | |
| 3,453,433 A | 7/1969 | Alger et al. | 250/83.3 |
| 3,508,438 A | 4/1970 | Alger et al. | 73/152 |
| 3,667,035 A | 5/1972 | Slichter | 324/0.5 R |
| 3,777,560 A | 12/1973 | Guignard | 73/151.5 |
| 4,310,887 A | 1/1982 | Suau | 364/422 |
| 4,479,564 A | 10/1984 | Tanguy | 181/105 |
| 4,710,713 A | 12/1987 | Taicher et al. | 324/303 |
| 4,714,881 A | 12/1987 | Givens | 324/303 |
| 4,717,876 A | 1/1988 | Masi et al. | 324/303 |
| 4,717,877 A | 1/1988 | Taicher et al. | 324/303 |
| 4,717,878 A | 1/1988 | Taicher et al. | 324/303 |
| 4,899,112 A | 2/1990 | Clark et al. | 324/338 |
| 4,933,638 A | 6/1990 | Kenyon et al. | 324/303 |
| 4,949,045 A | 8/1990 | Clark et al. | 324/338 |
| 4,987,368 A | 1/1991 | Vinegar | 324/303 |

(List continued on next page.)

FOREIGN PATENT DOCUMENTS

| | | | |
|---|---|---|---|
| EP | 0 581 666 A3 | 2/1994 | G01V/3/32 |
| EP | 0 649 035 B1 | 4/1995 | G01V/3/32 |
| WO | WO 92/10768 | 6/1992 | G01V/3/32 |
| WO | WO 98/25164 | 6/1998 | G01V/3/32 |

OTHER PUBLICATIONS

Akkurt et al., "Selection of Optimal Acquisition Parameters for MRIL Logs," SPWLA 37th Annual Logging Symposium, Jun. 16–19, 1996.

Brown et al. "Nuclear Magnetism Logging," Transactions of the American Institute of Mining, Metallurgical, and Petroleum Engineers, vol. 219 (1960), pp. 199–207.

(List continued on next page.)

Primary Examiner—Edward Lefkowitz
Assistant Examiner—Brij B. Shrivastav
(74) Attorney, Agent, or Firm—Pennie & Edmonds LLP

(57) ABSTRACT

A system and method for calculating the lateral velocity of a rotating drilling tool within a borehole, the system comprising: a pair of accelerometers placed oppositely across the drilling tool axis of rotation and two magnetometers. The method comprises: reading tool radial acceleration signals $a_{r1}$, $a_{r2}$, and tangential acceleration signals, $a_{t1}$ and $a_{t3}$, obtained with a quadrature accelerometer detection system; reading $B_x$ and $_y$, the tool's magnetic phase data, from two orthogonally placed magnetometers; determining, $\phi$, the rotational phase angle of the drilling tool relative to the earth's gravity field by first determining $\phi_m$, the tool's magnetic phase, and $\phi_)$, the phase shift between the tool's magnetic phase and gravity phase; and processing the foregoing data to yield a lateral tool velocity which optionally compensates for the effect of gravity on the accelerometers, or converts the lateral tool velocity from the tool reference frame to the borehole reference frame, or does both.

39 Claims, 12 Drawing Sheets

U.S. PATENT DOCUMENTS

| | | | |
|---|---|---|---|
| 5,023,551 A | 6/1991 | Kleinberg et al. | 324/303 |
| 5,055,787 A | 10/1991 | Kleinberg et al. | 324/303 |
| 5,055,788 A | 10/1991 | Kleinberg et al. | 324/303 |
| 5,122,746 A | 6/1992 | King et al. | 324/307 |
| 5,235,285 A | 8/1993 | Clark et al. | 324/342 |
| 5,280,243 A | 1/1994 | Miller | 324/303 |
| 5,291,137 A | 3/1994 | Freedman | 324/303 |
| 5,359,324 A | 10/1994 | Clark et al. | 340/854.3 |
| 5,363,041 A | 11/1994 | Sezginer | 324/303 |
| 5,376,884 A | 12/1994 | Abdurrahman Sezginer | 324/303 |
| 5,486,761 A | 1/1996 | Sezginer | 324/303 |
| 5,486,762 A | 1/1996 | Freedman et al. | 324/303 |
| 5,557,201 A | 9/1996 | Kleinberg et al. | 324/303 |
| 5,629,623 A | 5/1997 | Sezginer et al. | 324/303 |
| 5,705,927 A | 1/1998 | Sezginer et al. | 324/303 |
| 5,757,186 A | 5/1998 | Taicher et al. | 324/303 |
| 5,767,674 A | 6/1998 | Griffin et al. | 324/303 |
| 5,914,598 A | 6/1999 | Sezginer et al. | 324/303 |
| 5,923,167 A | 7/1999 | Chang et al. | 324/303 |
| 5,977,768 A | 11/1999 | Sezginer et al. | 324/303 |
| 6,008,646 A | 12/1999 | Griffin et al. | 324/303 |
| 6,107,797 A | 8/2000 | Sezginer | 324/303 |
| 6,115,671 A | 9/2000 | Fordham et al. | 702/8 |
| 6,121,774 A | 9/2000 | Sun | 324/303 |
| 6,133,734 A | 10/2000 | McKeon | 324/303 |
| 6,140,817 A | 10/2000 | Flaum et al. | 324/303 |
| 6,166,543 A | 12/2000 | Sezginer et al. | 324/303 |
| 6,237,404 B1 | 5/2001 | Crary et al. | 73/152.03 |
| 6,246,236 B1 | 6/2001 | Poitzsch et al. | 324/303 |
| 6,255,817 B1 | 7/2001 | Poitzsch et al. | 324/303 |
| 6,268,726 B1 | 7/2001 | Prammer et al. | 324/303 |
| 6,297,632 B1 * | 10/2001 | Speier | 324/303 |
| 6,362,619 B2 * | 3/2002 | Prammer et al. | 324/303 |

OTHER PUBLICATIONS

Chandler et al., "Improved Log Quality with a Dual–Frequency Pulsed NMR Tool," *Society of Petroleum Engineers* (1994) pp. 23–35.

Close et al., "Measurement of BHA Vibration Using MWD," IADC/SPE Drilling Conference, Feb. 28–Mar. 21, 1998, pp. 659–668.

Jackson et al., "Nuclear Magnetic Resonance Well Logging," The Log Analyst, Sep.–Oct., 1984, pp. 16–30.

Jackson et al., "Western Gas Sands Project Los Alamos NMR Well Logging Tool Development," Los Alamos National Laboratory (Oct. 1981–Sep. 1982) pp. 1–28.

Jansen et al., "Whirl and Chaotic Motion of Stabilized Drill Collars," SEP 20930, pp. 435–448, Jun. 1997.

Kleinberg et al., "Novel NMR apparatus for Investigating an External Sample," *Journal of Magnetic Resonance*, (1992), pp. 466–485.

Kleinberg et al., "Nuclear Magnetic Resonance of Rocks: $T_1$ vs. $T_2$," Society of Petroleum Engineers, SPE 26470, 1993, pp. 553–563.

Kleinberg et al., "NMR Properties of Reservoir Fluids," The Log Analyst, Nov.–Dec. 1996, pp. 20–32.

Menger et al., "A New Algorithm for Analysis of NMR Logging Data," Society of Petroleum Engineers, Inc., SPE 49013, 1998.

Miller et al., "Spin Echo Magnetic Resonance Logging: Porosity and Free Fluid Index Determination," *Society of Petroleum Engineers*, SPE 20561 (1990), pp. 321–334.

Prammer et al., "Theory and Operation of a New, Multi–Volume, NMR Logging System," SPWLA 40th Annual Logging Symposium, May 30–Jun. 3, 1999.

Prammer et al., "A New Multiband Generation of NMR Logging Tools," Society of Petroleum Engineers, SPE 49011, 1998.

*Schlumberger Technology News—Oilfield Bulletin*, "Fifth Generation Nuclear Magnetic Resonance Logging Tool: A Major Advance in Producibility Measurement Technology," (Jul. 1995) (2 pp.).

*Schlumberger Wireline & Testing*, "Combinable Magnetic Resonance tool reliably indicates water–free production and reveals hard–to–find pay zones," (Jun. 1995).

Singer et al., "Fast NMR Logging for Bound Fluid and Permeability," SPWLA 38th Annual Logging Symposium, Jun. 15–18, 1997.

* cited by examiner

US 6,518,756 B1

SYSTEMS AND METHODS FOR DETERMINING MOTION TOOL PARAMETERS IN BOREHOLE LOGGING

FIELD OF THE INVENTION

The present invention generally relates to borehole logging and more particularly, to systems and methods for determining parameters of the motion of a logging tool in a borehole and compensating for this motion in the logging data.

BACKGROUND OF THE INVENTION

Knowledge of the motion parameters of a logging tool relative to a borehole is important for obtaining accurate downhole measurement signals. Thus, for example, a shift in the sensitive volume of the logging tool caused by lateral motion of the tool relative to the borehole can distort the received signal and produce inaccurate measurements. Such distortions can be especially problematic in logging-while-drilling (LWD) and measurement-while-drilling (MWD) environments, where the tool itself is subjected to severe vibration. In some cases, the measurements may have to be completely discarded, as for example when a stick-slip condition occurs (where the drill bit stops rotating momentarily because of high friction and then rapidly accelerates when the moment exerted by the drill pipe exceeds the static friction). Clearly, it would be beneficial if the tool operator had access to information about the motions of the tool, so that measurements made during strong lateral and axial motions are discarded, or not even initiated.

Additionally, in many cases, it is important to select optimal activation times for the logging measurement and, if possible, to enable correction of the received signal based on the motion parameters of the logging tool. In such applications, it is necessary to accurately determine the lateral tool velocity of the tool in real time.

In the simplest system for measuring the lateral tool velocity relative to a borehole, two mutually orthogonal accelerometers can be placed on the tool axis, such that they are sensitive to the lateral acceleration. However, such placement is generally not possible in downhole tools because of design constraints, in particular owing to the need to have an open space within the center of the tool for a mud flow channel.

As such, in prior art systems for determining the lateral velocity of a drilling tool, two pairs of accelerometers are attached to diametrically opposite sides of the tool, usually near the surface of the tool. See, for example, co-pending application Ser. No. 09/232,072, filed Jan. 15, 1999, assigned to the assignee of the present application. This application is incorporated herein by reference for all purposes. The accelerometers together provide radial acceleration components, $a_{r1}$ and $a_{r2}$, and tangential acceleration components, $a_{t1}$ and $a_{t2}$, of the tool. Since the accelerometers rotate with the tool, their measurements are in the reference frame of the rotating tool, i.e., the rotating frame. Given their opposite placement, the accelerometer pairs register equal but opposite accelerations due to lateral tool motion and equal radial (centrifugal) as well as angular accelerations due to tool rotation. The radial and tangential forces due to tool rotation are compensated for the opposite accelerations by subtracting the reading of one accelerometer from the reading of the diametrically opposite one ($a_{r2}$ is subtracted from $a_{r2}$ and $a_{t2}$ is subtracted from $a_{t1}$). The remaining signal is twice the actual lateral tool acceleration in the directions of $a_{r1}$ and $a_{t1}$, respectively, as seen in the rotating frame. The acceleration components compensated for the centrifugal and angular accelerations are therefore given by the expressions:

$a_r=(a_{r1}-a_{r2})/2$, for the radial tool acceleration;

and $a_t=(a_{t1}-a_{t2})/2$, for the tangential tool acceleration.

The lateral velocity is calculated by integrating the above acceleration components. There are two main problems associated with this prior art approach. First, the signal measured by the accelerometers will also contain a gravitational component if the tool orientation is not vertical. The magnitude of the gravitational component is G sinα, where α is the angle of tool inclination relative to vertical and G is the gravitational acceleration constant. The frequency of the gravitational component is related to the tool rotation. Tool tilt away from vertical is sensed by the accelerometers and, thus, introduces an inaccuracy in the lateral tool acceleration readings.

Commonly, the gravitational acceleration component is removed from the signal by employing a high pass filter. The filter cut-off frequency is set to separate frequencies of the gravitational component modulated by the tool's rotation from the higher frequencies assumed to be caused by the tool's lateral motion. This technique, however, is not effective if the tool's rotational rate is high or not constant, for example, in a stick-slip situation, gravitational acceleration components are generated within the band of those related to the tool's lateral motion.

The second problem occurs because the accelerometers, which are placed on the tool, measure the tool's lateral velocity in the tool frame of reference rather than the desired borehole frame of reference.

With reference to FIG. 1B, while the motion parameters $a_r$ and $a_t$ are provided in the rotating reference frame, it is desirable to determine the corresponding motion parameters of the tool in the borehole reference frame XYZ. It will be appreciated that if the tool does not rotate, then the tool-reference parameters $a_r$ and $a_t$ are equivalent to the borehole reference parameters $a_x$ and $a_y$, and no conversion is necessary. If, however, the tool rotates, then $a_r$ and $a_t$ are different than $a_x$ and $a_y$, and conversion to the borehole frame of reference will be required. Similarly, it will be necessary to convert velocity components $v_r$ and $v_t$ to $v_x$ and $v_y$, corresponding to the borehole reference frame.

Obtaining accurate lateral tool velocity is important to ensure that the accuracy of NMR porosity measurements does not degrade by more than about 5%. For example, the lateral displacement of the tool's center of gravity should be limited to about 0.1 mm relative to the borehole within a measuring time frame of 500 μseconds. In practice, it is desirable that the lateral tool velocity should not exceed 0.2 m/sec during a typical NMR reading. Tool displacements greater than about 0.25 mm may introduce a system error associated with phase shift of the NMR echo. In addition to systemic error, the signal-to-noise may also degrade.

Therefore, there is a need to provide a system and method for accurately determining the lateral tool velocity and overcoming the deficiencies associated with the prior art. By knowing the tool's velocity, the NMR signal may be corrected. Additionally, along with velocity information, an uncertainty estimator can be calculated to provide confidence levels of the measurements.

SUMMARY OF THE INVENTION

The present invention is directed to a system and method for providing lateral tool velocity measurements corrected for a gravitational acceleration component, and for lateral velocity measurements in the borehole frame of reference. The invention allows correction of either one independently.

The system of the present invention comprises two pairs of accelerometers, a pair placed on opposite radial sides of the tool's rotational axis. Each of the two pairs of accelerometers detects both radial and tangential tool acceleration components. The system further comprises: two magnetometers placed orthogonally with respect to each other to detect the tool's magnetic phase (also called magnetic tool face); means for sampling the accelerometer and magnetometer signals; and means for real time processing and calculation of the corrected lateral tool velocity.

The method of the present invention includes: concurrently obtaining the tool's instantaneous radial and tangential accelerometer data as well as the tool's instantaneous magnetic phase data; determining the tool's gravitational phase data, and using this data to provide a corrected lateral tool velocity.

Accordingly, in one aspect, the invention is an apparatus for making borehole measurements using a logging tool, comprising: at least two accelerometers measuring motion parameters of the tool in a borehole, the motion parameters being measured in a tool reference frame; two or more magnetic induction sensors measuring magnetic induction dependent on the orientation of said accelerometers in relation to the gravitational field; and a processor computing the motion parameters of the tool in a borehole reference frame by taking into account the orientation of said accelerometers in relation to the gravitational field.

In another aspect, the invention is a method for making borehole measurements with a logging tool moving along a borehole subjected to a gravitational field, comprising: (a) measuring motion parameters of the tool in a tool reference frame; (b) estimating components of the measured motion parameters due to the gravitational field in the borehole; (c) computing a set of corrected motion parameters, the step of computing comprising removing the estimated components due to the gravitational field; and (d) providing at least one measurement along the borehole with the logging tool, said at least one measurement taking into account the computed set of corrected motion parameters.

BRIEF DESCRIPTION OF THE DRAWINGS

The present invention is best understood with reference to the attached drawings, in which.

DETAILED DESCRIPTION OF THE PREFERRED EMBODIMENTS

Figure 1A:
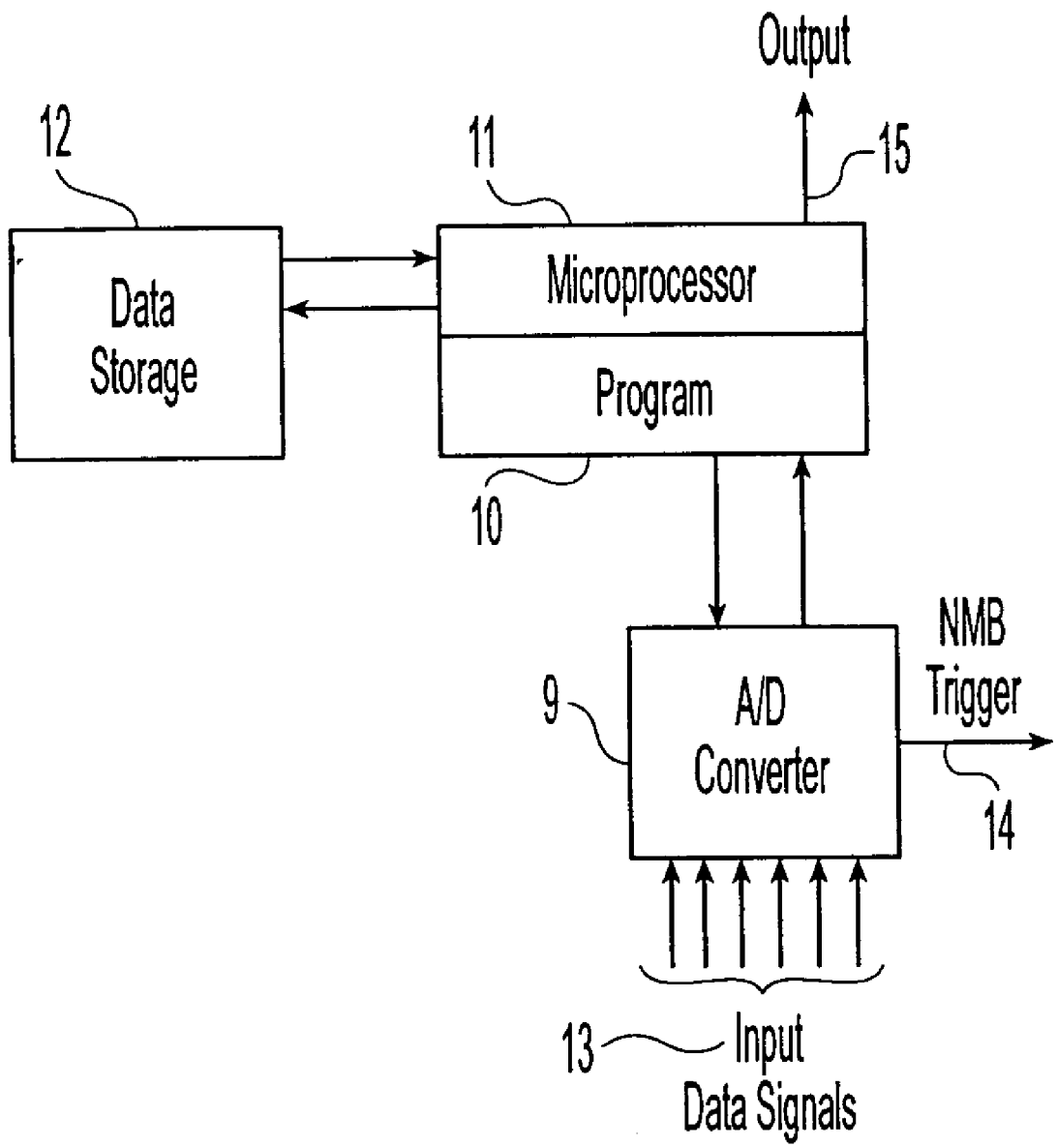
FIG. 1A shows a schematic diagram of the processing system.

The structure and function of the preferred embodiment can best be understood by reference to the attached drawings. Where the same reference numerals appear in multiple figures, the numerals refer to the same or corresponding structure in those figures.

A. The System of the Invention

In a preferred embodiment, the system of the present invention for determining the lateral velocity of a drilling tool comprises at least two pairs of accelerometers placed opposite each other across the tool axis of rotation, a first and second magnetometer placed on the tool to provide detection of the tool's rotational magnetic phase relative to the earth's gravitational field, an interface for reading signals from the accelerometers and magnetometers, and a data processor for providing a corrected value of lateral tool velocity in the borehole frame of reference.

As shown in FIG. 1A, in a preferred embodiment of the system, the interface for reading data signals comprises electrical or electronic circuitry (not shown) that is associated with the use of accelerometers and magnetometers, as known by those skilled in the art. The data processor generally is implemented using a microprocessor 11 which runs a software program 10 for accepting digital data signals from the accelerometers and magnetometer 13 and processing the raw data signals for instantaneous conversion. The interface includes an analog to digital (A/D) signal converter 9 used to convert raw data signals into digital signals. Appropriate software programming 10 is used to process and calculate corrected lateral tool velocities using the data. The system further provides an NMR output trigger 14 and a terminal output 15 to a monitor, printer, or similar output device. An optional data storage 12 may also be used for storing raw or processed data for later retrieval and processing.

Examples of equipment that can be used in accordance with the present invention include the digital signal processor model ADSP21060 SHARC chip from Analog Devices, which possesses a six channel A/D converter to accommodate acceleration and magnetic signals, micro-machined silicone accelerometers from Silicon Designs with a bandwidth of 5 kHz and magnetoresistive sensors (magnetometers) from Honeywell (Model HMC1002). Also included in a preferred embodiment of the system are communication channels (not shown) to control the digital processor and to retrieve real time velocity information, and a digital synchronization line to trigger the NMR measurements when the instantaneous lateral tool velocity is low.

Figure 1B:
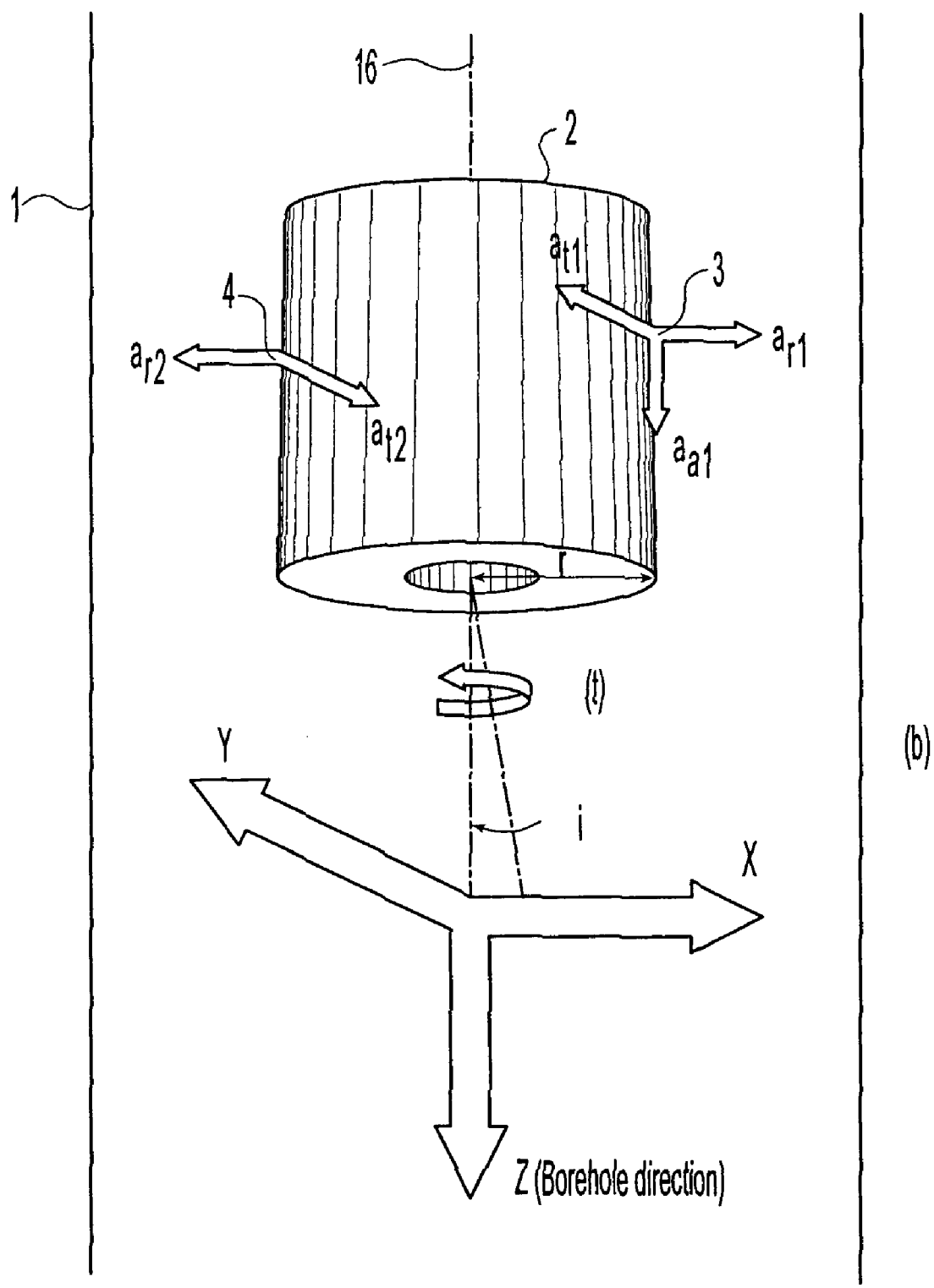
FIG. 1B depicts a generalized view of the rotating drill placed within a borehole.
Figure 2:
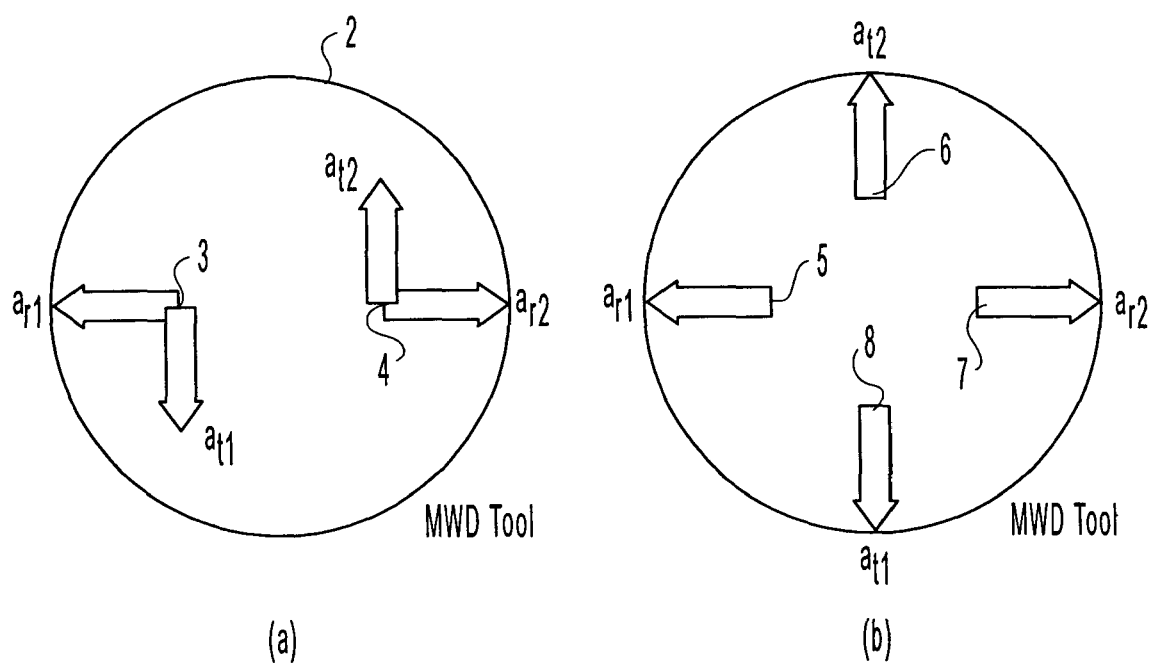
FIGS. 2A and 2B show cross-sectional views of a rotating drill tool with accelerometers in alternative placements.
Figure 3:
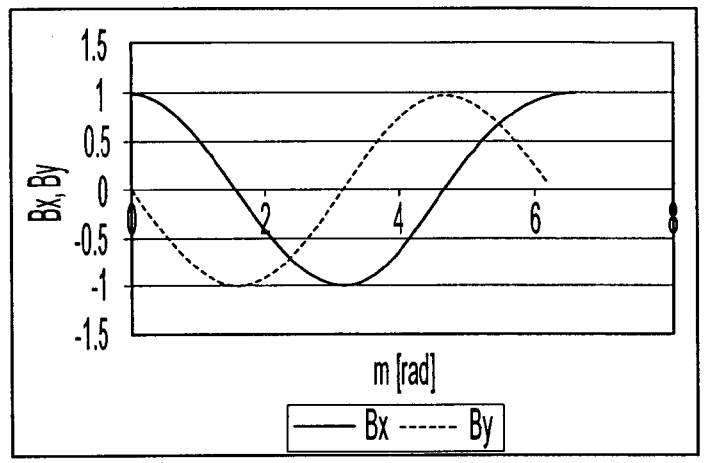
FIG. 3 shows the variation of the magnetic tool phase obtained in accordance with the invention with two magnetometers placed on the tool.

Referring to FIG. 1B and FIGS. 2A and 2B, in accordance with the present invention, the XYZ reference frame is related to the borehole 1, where the tool is placed. The (r-t-a) reference frame, on the other hand, is related to tool 2, which in general may be rotating. Accordingly, logging-while-drilling (LWD) and measurement-while-drilling (MWD) are natural practical applications of the present invention. In a preferred embodiment of the invention, two accelerometers 3 and 4, are placed opposite each other, across the tool axis of rotation 5, as shown in FIG. 2A. Accelerometer 3 provides orthogonal radial and tangential acceleration readings $a_{r1}$, $a_{t1}$, and, optionally, the axial acceleration tool component $a_{a1}$, (not shown). Accelerometer 4 provides the radial and tangential acceleration readings $a_{r2}$, $a_{t2}$ respectively, and optionally acceleration component $a_{a2}$. FIG. 2 shows an alternative preferred embodiment with four separate accelerometers, 5, 6, 7, and 8, each providing a single acceleration reading, which together operate in the same manner as the aforementioned two accelerometers. The two accelerometers, 3 and 4, provide $a_{r1}$, $a_{r2}$, $a_{t1}$ and $a_{t2}$, all located in the same plane. This arrangement provides a means of measuring lateral tool acceleration in the tool's rotating frame free of centrifugal and angular acceleration effects. In accordance with the present invention, a first and second magnetometer (exact position not shown) provide magnetic readings $B_x$ and $B_y$. The magnetometers are mounted on or in the drilling tool 2 to provide the tool's orthogonal magnetic readings $B_x$ and $B_y$ relative to the earth's magnetic field vector. Preferably, the magnetometers should be placed on or in the tool linearly aligned with the position of the accelerometers and the tool axis of rotation 16.

Figure 17:
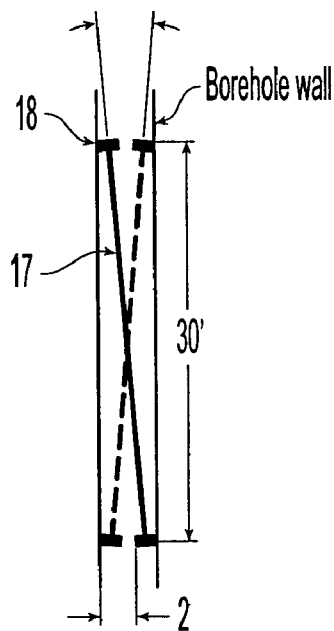
FIG. 17 is a diagrammatic view of the tool axis in the borehole, the tool having a drill collar and stabilizer.

Additional parts of the tool of the drilling system are depicted in FIG. 17, including the drill collar 17 and stabilizer 18.

B. The Method of the Invention

In accordance with the preferred embodiment, the method of the invention permits two independent corrections. The first correction removes the gravitational component from the acceleration readings that results when the tool is tilted away from the vertical direction. The second correction provides the lateral velocity of the drilling tool relative to a borehole reference frame.

In a preferred embodiment, the method which corrects both inaccuracies includes the following steps (discussed again in greater detail later):

(a) reading the instantaneous tool lateral acceleration components, $a_{r1}$, $a_{r2}$, $a_{t1}$, and $a_{t2}$, employing an accelerometer detection system and reading the tool's instantaneous magnetic values $B_x$ and $B_y$;

(b) compensating for the centrifugal and radial acceleration components by calculating lateral tool accelerations in the rotating frame of reference:

$a_r = (a_{r1} - a_{r2})/2$ the tool acceleration in the direction of $a_{r1}$;

$a_t = (a_{t1} - a_{t2})/2$ the tool acceleration in the direction of $a_{t1}$;

(c) calculating the tool's instantaneous magnetic phase relative to the earth's magnetic field (tool magnetic phase) $\phi_m$;

(d) using the accelerometer and magnetometer instantaneous data readings, determining the phase shift $\phi_o$, which is the difference between the magnetic phase $\phi_m$ and gravitational tool phase $\phi$, determining the borehole inclination gravitational component $G \sin(\alpha_i)$ relative to vertical; and (e) calculating the tool lateral acceleration components and optionally, correcting for the gravitational component, or converting the measurements to the borehole frame of reference, or doing both; and (f) calculating the initial velocity and the instantaneous velocity by integrating the acceleration components calculated in step (e).

In accordance with the present invention, the signals recorded by the accelerometers are related to other system variables by the following expressions:

$$a_{r1} = a_x \cos(\phi) + a_y \sin(\phi) + r\omega^2 + G \sin(\alpha_i)\cos(\phi)$$

$$a_{r2} = -a_x \cos(\phi) - a_y \sin(\phi) + r\omega^2 - G \sin(\alpha_i)\cos(\phi)$$

$$a_{t1} = a_x\cos(\varphi) + a_y\sin(\varphi) + r\frac{d\omega}{dt} + G\sin(\alpha_i)\sin(\varphi)$$

$$a_{t2} = -a_x\cos(\varphi) - a_y\sin(\varphi) + r\frac{d\omega}{dt} + G\sin(\alpha_i)\sin(\varphi)$$

$$a_{a1} = a_z + G \cos(a_1) \tag{1}$$

where:

$a_x$, $a_y$, and $a_z$ are the acceleration components of the tool's center of gravity relative to the borehole XYZ reference frame;

$\phi$ is the instantaneous phase of the rotating tool ($\phi=0$ when $a_{r1}$ is aligned with the X axis);

$\alpha_i$ is the tool inclination angle in relation to the earth's gravity vector (vertical);

r is the rotational radius of the accelerometer; and

G is the acceleration constant of the earth's gravitational field ($\cong 9.81$ m/s$^2$).

$G \sin(\alpha_i)\sin(\phi)$ and $G \sin(\alpha_i)\cos((\phi)$ are the gravitational components arising from tool tilt away from vertical.

The tool phase $\phi$ is:

$$\varphi(t) = \varphi_{t0} + \int_0^t \omega(t)dt \tag{2}$$

where $\omega$ is the instantaneous angular speed of the tool. From previous equations for $a_{r1}$ and $a_{r2}$ the module of $\omega$ is calculated as $$|\omega| = \sqrt{\frac{a_{r1} + a_{r2}}{2r}} \quad (3)$$

and the angular acceleration is $$\frac{d\omega}{dt} = \frac{a_{r1} + a_{r2}}{2r}. \quad (4)$$

By tracking both $|\omega|$ and $d\omega/dt$, $\omega$ can be determined.

Employing the above relationships, and the described hardware system and programming software, the method for obtaining lateral tool velocity with correction for the gravitational component and conversion of the velocity relative to a borehole reference frame is now discussed in detail. The method includes the following particular steps.

Step a. Obtain instantaneous tool lateral acceleration components $a_{r1}$, $a_{r2}$, $a_{t1}$, and $a_{t2}$, and the tool's instantaneous magnetic values $B_x$ and $B_y$.

In a preferred embodiment, this step requires reading real-time data signals from the two (or more) accelerometers and two magnetometers to obtain the parameters $a_{r1}$, $a_{r2}$, $a_{t1}$, $a_{t2}$, $B_x$ and $B_y$. Parameters $B_x$ and $B_y$ are orthogonal magnetic phase readings relative to the earth's magnetic field.

Step b. Compensate for the centrifugal and radial acceleration components by calculating lateral tool accelerations in the rotating frame of reference employing the following formulas:

$a_r=(a_{r1}-a_{r2})/2$ the tool acceleration in the direction of $a_{r1}$;

$a_t=(a_{t1}-a_{t2})/2$ the tool acceleration in the direction of $a_{t1}$;

Step c. Determine $\phi_m$, the tool's instantaneous magnetic phase relative to the earth's magnetic field (tool magnetic phase).

The magnetic phase readings are used to determine the tool's magnetic phase with respect to the earth's gravitational pull. The direction of the magnetic field in space however, does not directly coincide with the gravitational pull; there is a phase difference (phase shift) of $\phi_o$. In most conditions, where the magnetic field disturbance is not strong and the borehole has a relatively constant direction, the phase shift $\phi_o$ will be a constant within the time frame of the few seconds necessary to determine the tool velocity. Therefore, the relationship $\phi=\phi_m+\phi_o=a$ constant, can be reasonably assumed. Knowing $B_x$ and $_y$, the tool's magnetic rotation phase $\phi_m$ may be obtained according to the present invention using the expressions:

$B_x=B \sin(\alpha_m)\cos(\phi_m)$ $B_y=B \, n\sin(\alpha_m)\sin(\phi_m)$ \quad (5)

where B is the amplitude of the magnetic induction signal, and $\alpha_m$ is the angle between the tool's axis and the earth's magnetic field vector.

The tool magnetic phase $\phi_m$ is determined directly from (5) provided that the borehole direction does not coincide with the direction of the B vector such that the noise level of the magnetic measurements is comparable to the signals $B_x$ and $B_y$. Knowing $B_x$ and $B_y$, the tool's magnetic rotation phase $\phi_m$ may be obtained by using the function $\phi$=a tan 2 (By, Bx) common to most mathematical function libraries. The function a tan 2 resolves all four quadrants of the full angle (360 degrees).

Step d. Determine the phase shift $\phi_o$ and the borehole inclination gravitational component $G \sin(\alpha_i)$ relative to vertical, using the accelerometer and magnetometer instantaneous data readings, and calculate $\phi$.

If a correction for tool tilt is not desired, then it is unnecessary to determine $G \sin(\alpha_i)$ in this step. However, it is the usual case to correct for the effect of tool tilt. The following procedure is used in a preferred embodiment to determine $G \sin(\alpha_o)$ and $\phi_i$, where G is the acceleration constant of earth's gravitational field ($\cong 9.81$ m/s$^2$). The tool magnetic phase $\phi_m$ is known from the previous step. $G \sin(\alpha_i)$ can be calculated under the assumption that the gravitational component does not contribute to the lateral acceleration of the tool.

Figure 4:
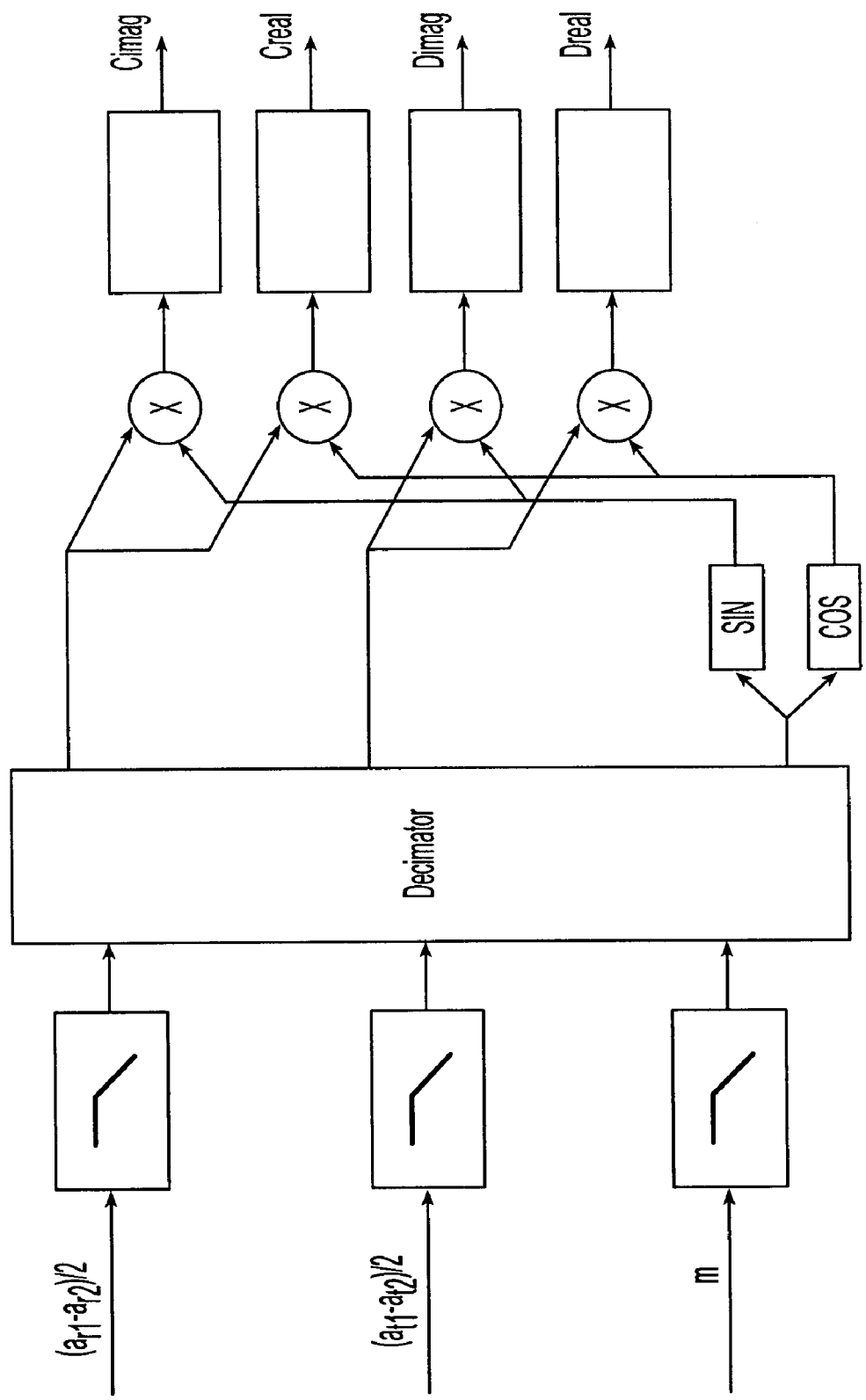
FIG. 4 is a block diagram showing the processing required to determine the gravitational component of the acceleration signals in a preferred embodiment.

As shown in FIG. 4, the acceleration signals, with centrifugal component removed, along with the $\phi_m$ phase information, are filtered through identical low-pass filters having in a preferred embodiment a 20 Hz cutoff frequency. The 20 Hz cutoff is believed adequate to pass all gravity-related components, although it will be appreciated that different frequencies may be used in alternative embodiments.

The signals are then decimated and fed into a quadrature detector known to those skilled in the art. In the quadrature detector both acceleration signals $a_r$ and $a_t$ are multiplied by the $\sin(\phi_m)$ and $\cos(\phi_m)$. The outputs averaged over time (few seconds in a preferred embodiment) yield two complex numbers c and d, where:

$$c_{real} = \frac{1}{N}\sum_{i=1}^{N} a_{ri}\cos(\varphi_{mi}); \; d_{real} = \frac{1}{N}\sum_{i=1}^{N} a_{ti}\cos(\varphi_{mi})$$

$$c_{imag} = \frac{1}{N}\sum_{i=1}^{N} a_{ri}\sin(\varphi_{mi}); \; d_{imag} = \frac{1}{N}\sum_{i=1}^{N} a_{ti}\sin(\varphi_{mi})$$

Where:

N is the number of signal samples processed during the averaging;

$a_{ri}$ and $a_{ti}$ are consecutive samples of $a_r$ and $a_t$, respectively; and $\phi_{mi}$ are consecutive samples of $\phi_m$.

Both complex numbers are 90 degrees out of phase since the gravitational component is 90 degrees out of phase in $a_r$ and $a_t$ respectively. The magnitude of these complex numbers equals to $0.5 \, G \sin(\alpha_i)$ and the phase of c equals to $\phi_o$, therefore:

$G \sin(a_i)=2\sqrt{c_{real}^2+c_{imag}^2}$ $\phi_o=a \tan 2(c_{imag}, c_{real})$ Once the phase shift $\phi_o$ is found from step (d), combined with the parameter $\phi_m$ known from the previous step, $\phi$ may be calculated according to the relationship:

$\phi=\phi_m+\phi_o$

The same information can be obtained from the complex number d, remembering that there is a 90 degree phase shift between c and d. If the magnitude and phase is obtained from both complex outputs, in a preferred embodiment it can be averaged to decrease uncertainty.

This process yields both the phase shift $\phi_o$ and magnitude of the gravitational component $G \sin(\alpha_i)$. The time constants of the averaging process can be as long as 30 seconds or more, if the phase information from magnetic sensors is used, since there is no systematic drift between the $\phi_m$ and $\phi_o$ other than changes of the borehole direction or of the magnetic field, which typically are very slow.

To assess the quality of the real-time data, the standard deviation of each measured/calculated quantity may be determined, if possible. If the same information is available from several sources, preferably the one with the lowest standard deviation is chosen. Based on individual uncertainty estimates, the uncertainty of velocity determination can be calculated and made available to the computer system for storage.

While phase detection is desirably obtained by using magnetometers, this method is not available when the tool axis coincides with the magnetic vector. An alternative, although less accurate method of phase determination using the accelerometer signals, is available in accordance with a specific embodiment of the present invention. According to Eq. (2), the gravitational tool phase $\phi$ can be calculated as an integral of the instantaneous angular velocity $\omega$, which can be determined from Eq. (3) and Eq. (4). It will be appreciated that this approach is sensitive to accelerometer scale error and may suffer from poor resolution of $\omega$ at low speeds. Nonetheless, in accordance with the invention, the approach can serve as a backup algorithm in situations where magnetic information is not available.

Step e. Calculate the lateral tool acceleration components in the borehole reference frame and, optionally, correct for the gravitational component, or convert the measurements to the borehole reference frame, or do both.

To obtain lateral accelerations $a_x$ and $a_y$, the raw acceleration signals are subtracted so that centrifugal and angular acceleration components cancel out:

$$\frac{a_{r1} - a_{r2}}{2} = a_x \cos(\varphi) - a_y \sin(\varphi) + G \sin(\alpha_i) \cos(\varphi) \quad (7)$$

$$\frac{a_{r1} - a_{r2}}{2} = a_x \sin(\varphi) + a_y \cos(\varphi) + G \sin(\alpha_i) \sin(\varphi)$$

The signals above also contain the modulated gravitational component $G \sin(\alpha_i)\cos(\phi)$. Since $G \sin(\alpha_i)$ and $\phi$ have been determined in the previous step, in accordance with the present invention the gravitational component can be subtracted from both signals yielding accelerations corrected for gravitational components $a_{rg}$ and $a_{tg}$:

$$a_x \cos(\phi) - a_y \sin(\phi) = a_{rg}$$

$$a_x \sin(\phi) + a_y \cos(\phi) = a_{tg} \quad (8)$$

Step f: Transforming the accelerations into the formation reference frame XYZ.

Solving Eq. (7), yields:

$$a_x = -a_{rg} \cos(\phi) + a_{tg} \sin(\phi)$$

$$a_y = a_{rg} \sin(\phi) + a_{tg} \cos(\phi) \quad (9)$$

Equation (9) is used to convert the tool acceleration from the (r-t-a) reference frame to the XYZ borehole reference frame. All variables have been previously determined in order to calculate $a_x$ and $a_y$. Note also that Eq. (9) may be used when no correction is desired for the gravity effect of tool tilt on the accelerometers, and only a conversion to the borehole frame of reference is desired.

Step g. Calculate the lateral velocity components by calculating initial velocity and integrating the instantaneous acceleration found in step e.

Knowing $a_x$ and $a_y$ from the previous step, the lateral velocity components $v_x$ and $v_y$ may be calculated. The lateral velocity calculation is provided in a preferred embodiment as follows:

$$\int_{T_0}^{t} v_x(t) = v_{0x}(t - T_0) + \int \int_{T_0}^{t} a_x(t) dt^2 \leq \Delta s \quad (10)$$

$$\int_{T_0}^{t} v_y(t) = v_{0y}(t - T_0) + \int \int_{T_0}^{t} a_y(t) dt^2 \leq \Delta s$$

where $v_{ox}$ and $v_{oy}$ are unknown initial velocities at arbitrarily chosen time $T_0$. Since the borehole restrains the motion of the tool during any period, the lateral displacement is less than or equal to the slack $\Delta s$ between the drill collar and the borehole wall.

Since values of $a_x$ and $a_y$ are known at any point in time, the initial velocities $v_{ox}$ and $v_{oy}$ can be calculated from:

$$v_{0x} \approx -\frac{\int \int_{T_0}^{t} a_x(t) dt^2}{t - T_0} \quad (11)$$

$$v_{0y} \approx -\frac{\int \int_{T_0}^{t} a_y(t) dt^2}{t - T_0}$$

with the uncertainty of the measurement method less than $\Delta s/(d-T_0)$. For example, to achieve an uncertainty of 0.02 m/s in a borehole having a slack of 5 cm, the minimum integrating time should be 2.5 seconds.

After the individual lateral velocity components are extracted, the modulus of the lateral velocity is calculated in accordance with the invention as:

$$v = v_x^2 + v_x^2 \quad (12)$$

Once the instantaneous velocity is calculated, the decision can be made whether to initiate an NMR measurement.

Figure 5:
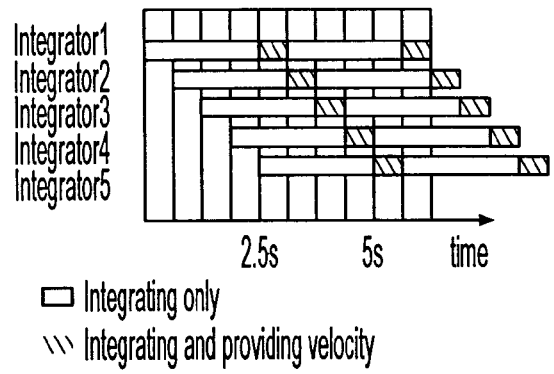
FIG. 5 is a schematic diagram illustrating the processing steps for calculating velocity using a multiple window approach.

In order to use the velocity calculation as described by equations (10–12) with computer processing, it is desirable to simplify the data processing to minimize the calculations. Thus, assuming a minimum $T_0$ of 2.5 seconds and a sampling frequency of 8 kHz, the number of samples integrated would exceed 20,000. The memory requirement for direct implementation would be substantial. Therefore, in a preferred embodiment, a multiple-window approach is performed, wherein the integrals are calculated over K partially overlapping time windows as shown in FIG. 5. The individual samples do not have to be stored, only the integrals and number of samples integrated. When an integrator reaches the preset number of samples, i.e., 2.5 seconds worth of data in a specific embodiment, it becomes the source of velocity information for the system, until the next-in-line integrator reaches the minimum number of samples. Then the first integrator is reset and begins another new integration, while the second integrator provides velocity information. This processing approach tolerates some discontinuity in the velocity signal that is introduced when switching integrators in the Kth increase during processing. However, as simplified using the above approach the calculations are manageable and provide reasonably accurate results. The performance of recursive filters during velocity retrieval may also be tested in a specific embodiment.

C. Typical Acceleration Signals Provided in the Tool Reference Frame and System Bandwith Concerns A data set obtained from J. Dudley's, "MIL MWD Sensor Physics" DNMWD016 Rev.1a, Security DBS, was analyzed to assess the magnitude and spectral composition of typical lateral tool accelerations. This reference provides graphs of a complete data set in the reference frame of the rotating tool (drill bit), and is hereby incorporated by reference. The following example data analysis focuses only on the radial component of the tool acceleration and only for selected fragments. No calibration information is provided.

The centrifugal acceleration depends on the radius and angular velocity of the tool. The accelerometer's operating radius is limited by the tool's diameter. The average angular velocity of the tool equals the driving velocity. However, under stick-slip situations, the instantaneous velocity may change quite rapidly.

Figure 6:
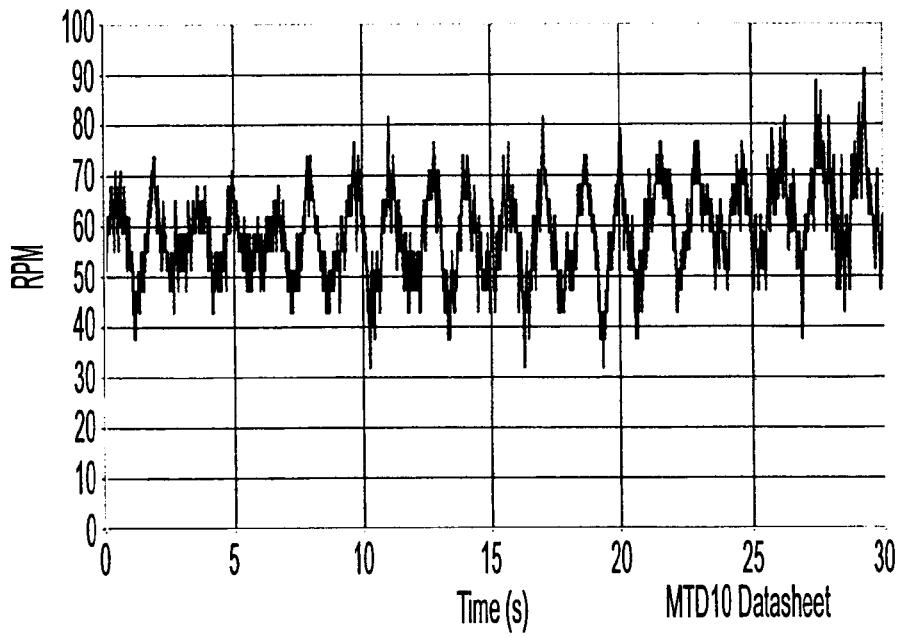
FIG. 6 is a graph of instantaneous angular velocity with low vibration.
Figure 7:
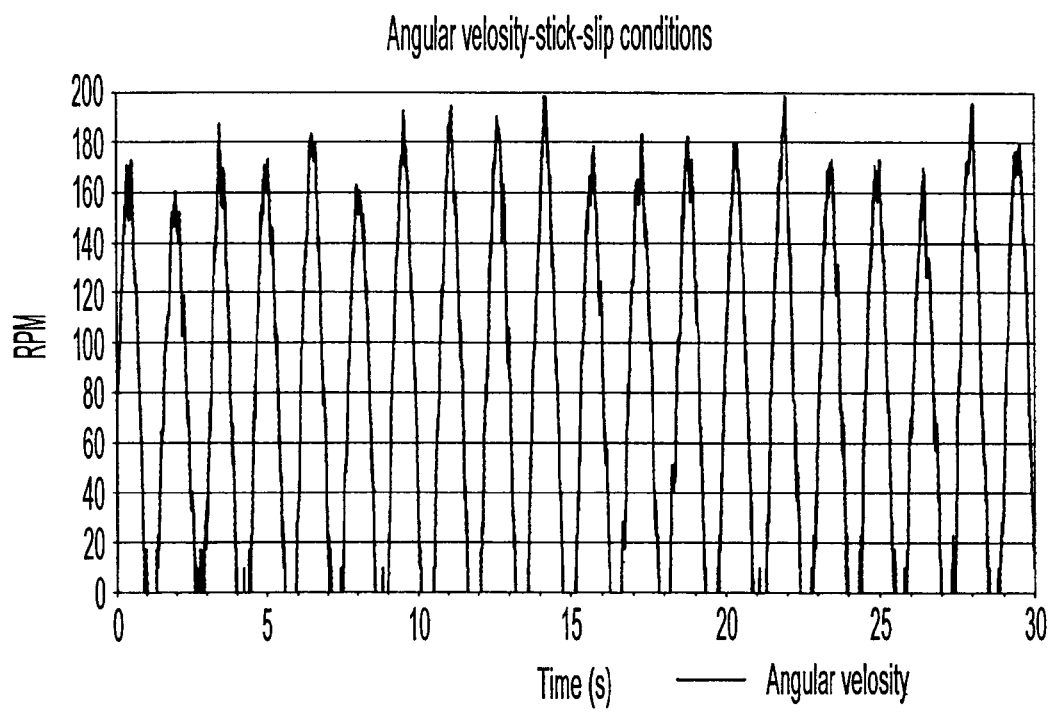
FIG. 7 is a graph of instantaneous angular velocity in stick-slip conditions.

The natural frequency of the tool string and forces on the bit modulate the instantaneous angular velocity of the tool. Even during relatively vibration-free periods, $\omega$ tends to oscillate, as illustrated in FIG. 6. The angular velocity modulation is much more dramatic in stick-slip conditions, where the drill bit actually stops rotating for fractions of a second. From a momentary standstill, the bit accelerates when the moment exerted by the winding drill pipe exceeds the static friction. The peak angular velocity under stick-slip conditions is more than twice the average velocity. FIG. 7 illustrates the condition.

Figure 8:
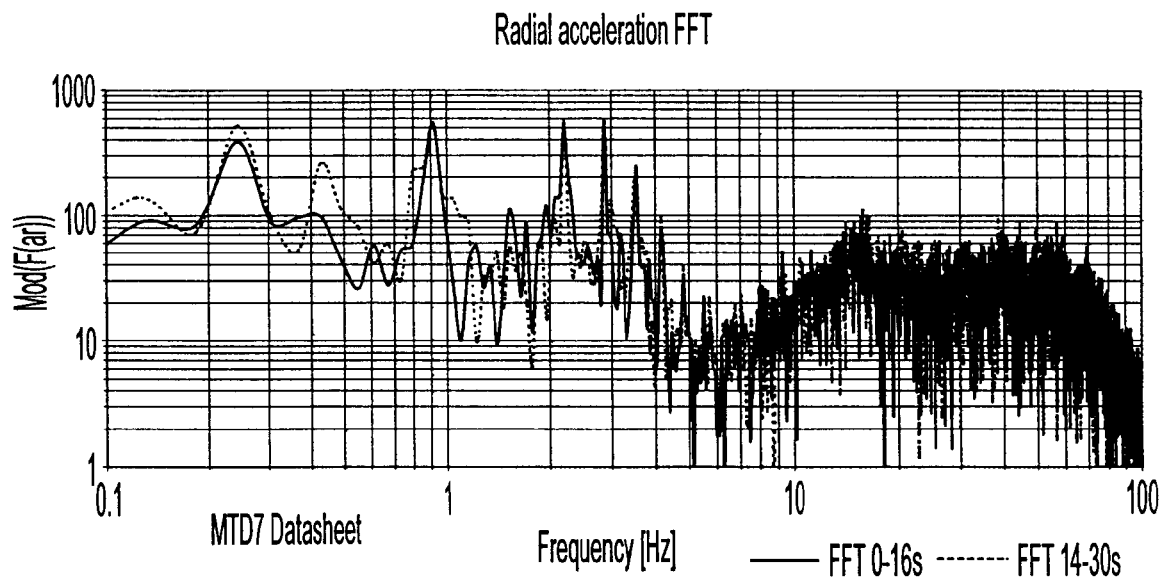
FIG. 8 is a graph of the spectral power density of lateral acceleration under stick-slip conditions.
Figure 9:
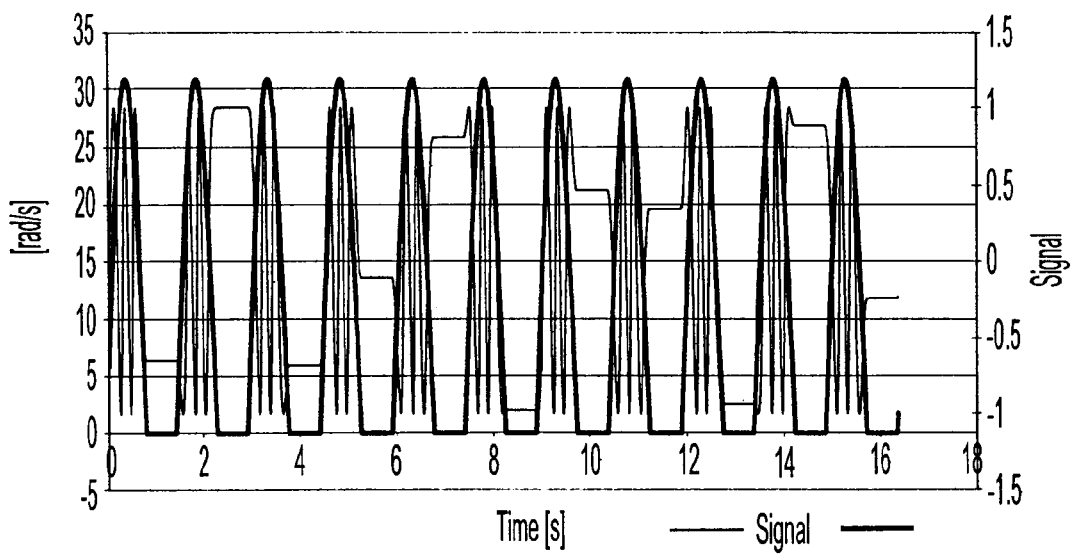
FIG. 9 is a graph of a computer synthesized frequency modulated signal in simulated stick-slip condition.
Figure 10:
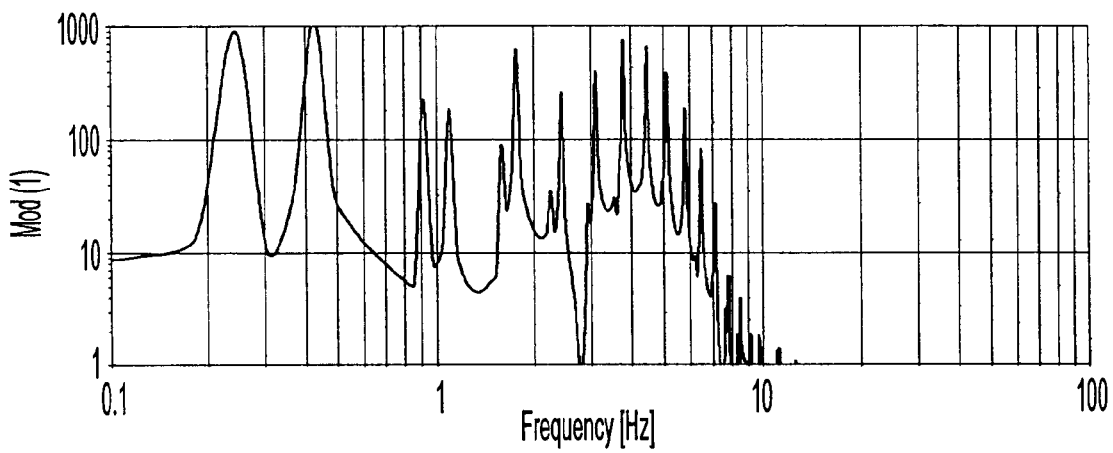
FIG. 10 is a graph of the spectrum of a computer synthesized frequency modulated signal.

The acceleration data provided by Sperry-Sun in a report by J. D. Jansen, "Whirl and Chaotic Motion of Stabilized Drill Collars" SPE 20930, pp. 435–448, are in the rotating tool reference frame. The reference is hereby incorporated by reference. FIG. 8 illustrates the Fast Fourier Transform (FFT) of two 16 second fragments of acceleration data. The spectrum contains strong peaks of frequency modulated base rotational component caused by the effect of gravity on the tilted tool. The peaks are spaced about 0.7 Hz apart, which is the modulating frequency likely closest to the natural frequency of the tested toolstring. For comparison, a signal was modeled with 0.92 Hz base frequency modulated with 0.67 Hz non-harmonic signal resembling the measured signal, as illustrated in FIG. 9. Its FFT is shown in FIG. 10. The modeled signal has a spectrum resembling that of the measured signal. However, the amplitudes of the individual peaks, which are governed by Bessel functions, depend on a deviation coefficient. Both FFT's in this example were calculated from a set of 4096 signal data points sampled at a rate of 250 Hz.

The frequency spectrum in FIG. 7 displays both the gravitational component dominating at lower frequencies, and the lateral motion component. An ideal signal would display only the gravitational component. The gravitational component is bandwidth limited to approximately $2(\Delta f+2f_m)$, where $\Delta f$ is the maximum frequency deviation and $f_m$ is the maximum modulating frequency. Assuming a 5 Hz maximum frequency deviation during drilling and a maximum modulating component of 2.5 Hz, the bandwidth of the gravitational signal would stretch up to 20 Hz.

Since the lateral motion of the tool can be described in the frequency domain as a sum of harmonic motions of various frequencies, it is possible to determine the low frequency cutoff of the measurement system based on a desired velocity accuracy, and a maximum allowable amplitude of the tool's movement which is limited by the borehole walls. See Table 1. For example, for a typical 2 cm or 4 cm peak-peak amplitude limitation, the system must pass accelerations down to 0.2 Hz in order to achieve a precision of 0.025 m/s. The peak acceleration in that case would be approximately 3 mG, this value giving an indication of the required maximum resolution of the accelerometer at the lowest frequencies.

TABLE 1

Max velocity vs. frequency and amplitude of harmonic lateral motion

| | | Amplitude [m]>> | | | | | | | | | |
|---|---|---|---|---|---|---|---|---|---|---|---|
| f [Hz] | ω [rad/s] | 0.0001 | 0.0002 | 0.0005 | 0.001 | 0.002 | 0.005 | 0.01 | 0.02 | 0.05 | 0.1 |
| | | | | | Max velocity in m/s | | | | | | |
| 0.1 | 0.63 | 0.0001 | 0.0001 | 0.0003 | 0.0006 | 0.0013 | 0.003 | 0.006 | 0.013 | 0.031 | 0.063 |
| 0.2 | 1.26 | 0.0001 | 0.0003 | 0.0006 | 0.0013 | 0.0025 | 0.006 | 0.013 | 0.025 | 0.063 | 0.126 |
| 0.5 | 3.14 | 0.0003 | 0.0006 | 0.0016 | 0.0031 | 0.0063 | 0.016 | 0.031 | 0.063 | 0.157 | 0.314 |
| 1 | 6.28 | 0.0006 | 0.0013 | 0.0031 | 0.0063 | 0.0126 | 0.031 | 0.063 | 0.126 | 0.314 | 0.628 |
| 2 | 12.57 | 0.0013 | 0.0025 | 0.0063 | 0.0126 | 0.0251 | 0.063 | 0.126 | 0.251 | 0.628 | 1.257 |
| 5 | 31.42 | 0.003 | 0.006 | 0.016 | 0.031 | 0.063 | 0.157 | 0.314 | 0.628 | 1.571 | 3.142 |
| 10 | 62.83 | 0.006 | 0.013 | 0.031 | 0.063 | 0.126 | 0.314 | 0.628 | 1.257 | 3.142 | 6.283 |
| 20 | 125.66 | 0.013 | 0.025 | 0.063 | 0.126 | 0.251 | 0.628 | 1.257 | 2.513 | 6.283 | 12.566 |
| 50 | 314.16 | 0.031 | 0.063 | 0.157 | 0.314 | 0.628 | 1.571 | 3.142 | 6.283 | 15.708 | 31.416 |
| 100 | 628.32 | 0.63 | 0.126 | 0.314 | 0.628 | 1.257 | 3.142 | 6.283 | 12.566 | 31.416 | 62.832 |
| 200 | 1256.64 | 0.126 | 0.251 | 0.628 | 1.257 | 2.513 | 6.283 | 12.566 | 25.133 | 62.832 | 125.664 |
| 500 | 3141.59 | 0.314 | 0.628 | 1.571 | 3.142 | 6.283 | 15.708 | 31.416 | 62.832 | 157.080 | 314.159 |
| 1000 | 6283.19 | 0.628 | 1.257 | 3.142 | 6.283 | 12.566 | 31.416 | 62.832 | 125.664 | 314.159 | 628.319 |

TABLE 2

Peak acceleration vs. frequency and amplitude of harmonic lateral motion

| | | Amplitude [m]>> | | | | | | | | | |
|---|---|---|---|---|---|---|---|---|---|---|---|
| f [Hz] | ω [rad/s] | 0.0001 | 0.0002 | 0.0005 | 0.001 | 0.002 | 0.005 | 0.01 | 0.02 | 0.05 | 0.1 |
| | | | | | Max Acceleration in G | | | | | | |
| 0.1 | 0.63 | 0.000 | 0.000 | 0.000 | 0.000 | 0.000 | 0.000 | 0.000 | 0.001 | 0.002 | 0.004 |
| 0.2 | 1.26 | 0.000 | 0.000 | 0.000 | 0.000 | 0.000 | 0.001 | 0.002 | 0.003 | 0.008 | 0.016 |
| 0.5 | 3.14 | 0.000 | 0.000 | 0.001 | 0.001 | 0.002 | 0.005 | 0.010 | 0.020 | 0.050 | 0.101 |
| 1 | 6.28 | 0.000 | 0.001 | 0.002 | 0.004 | 0.008 | 0.020 | 0.040 | 0.080 | 0.201 | 0.402 |
| 2 | 12.57 | 0.002 | 0.003 | 0.008 | 0.016 | 0.032 | 0.080 | 0.161 | 0.322 | 0.805 | 1.610 |
| 5 | 31.42 | 0.010 | 0.020 | 0.050 | 0.101 | 0.201 | 0.503 | 1.006 | 2.012 | 5.0 | 10.1 |

TABLE 2-continued

Peak acceleration vs. frequency and amplitude of harmonic lateral motion

Amplitude [m]>>

| f [Hz] | ω [rad/s] | 0.0001 | 0.0002 | 0.0005 | 0.001 | 0.002 | 0.005 | 0.01 | 0.02 | 0.05 | 0.1 |
|---|---|---|---|---|---|---|---|---|---|---|---|
| | | | | | Max Acceleration in G | | | | | | |
| 10 | 62.83 | 0.040 | 0.080 | 0.201 | 0.402 | 0.805 | 2.012 | 4.024 | 8.049 | 20.1 | 40.2 |
| 20 | 125.66 | 0.161 | 0.322 | 0.805 | 1.610 | 3.219 | 8.049 | 16.1 | 32.2 | 80.5 | 161.0 |
| 50 | 314.16 | 1.01 | 2.01 | 5.03 | 10.06 | 20.12 | 50.30 | 100.6 | 201.2 | 503.0 | 1006.1 |
| 100 | 628.32 | 4.02 | 8.05 | 20.12 | 40.24 | 80.49 | 201.2 | 402.4 | 804.9 | 2012.2 | |
| 200 | 1256.64 | 16.1 | 32.2 | 80.5 | 161.0 | 321.9 | 804.9 | 1609.7 | 3219.4 | | |
| 500 | 3141.59 | 100.6 | 201.2 | 503.0 | 1006.1 | 2012.2 | 5030.4 | | | | |
| 1000 | 6283.19 | 402.4 | 804.9 | 2012.2 | 4024.3 | 8048.6 | | | | | |

The above estimate is only valid for a system that does not rotate. If the tool rotates with constant $\omega_o$ then the acceleration induced by the slow lateral motion $\omega$ would be modulated as the rotational signal shifts to $\omega_o-\omega$ and $\omega_o+\omega$. However, there are conditions under which the tool stops rotating while performing measurements.

Table 2 above shows the peak accelerations observed during harmonic lateral motion. For example, to observe 50 G acceleration, the tool must vibrate at a frequency of 50 Hz with an amplitude of 5 mm or 10 mm peak-peak.

Figure 11:
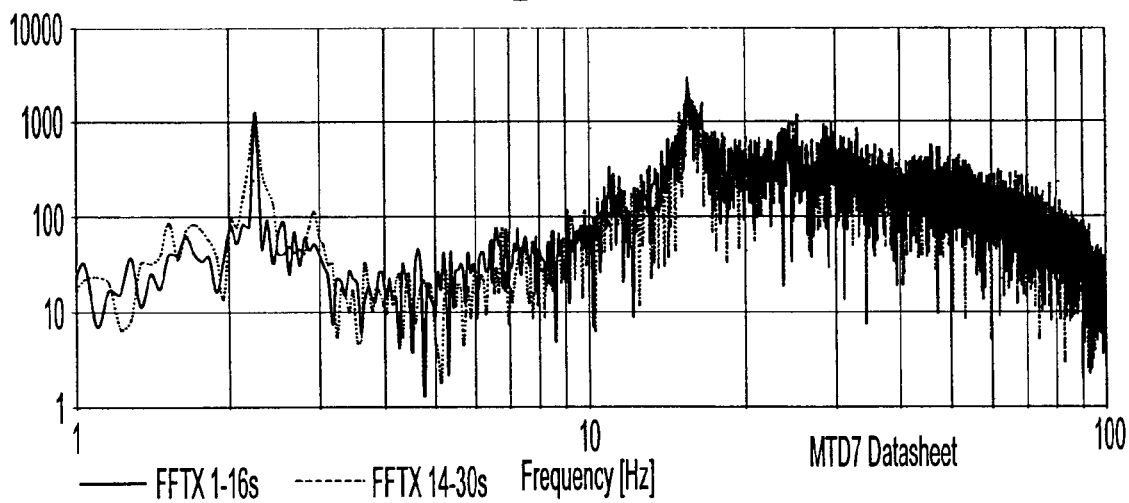
FIG. 11 is a graph of a Fourier transform of the accelerometer signal during bit whirl.

The strongest accelerations were observed during bit whirl. Peak values of about 13–14 G were detected in Dudley's sample accelerations. As shown in FIG. 11, the FFT of the accelerometer signal during bit whirl indicates high frequency components peaking around 15 Hz with substantial content extending past 100 Hz. The frequency beyond 100 Hz in this sample is unreliable owing to a 250 Hz sampling rate and additional use of a 125 Hz low pass filter for internal filtering. If resolution of higher frequencies in excess of 100 Hz is desired, data should be collected at faster sampling rates without digital filtering. Additionally, it is advisable to shape the frequency response of the anti-aliasing filter to prevent further distortion of the spectrum. It should be noted that the observed peak acceleration will be affected by the spectral response of the entire measuring system.

Close et al., IADC/SPE 17273, pp. 559–568, conducted measurements of Borehole Assembly (BHA) vibration while drilling using a sampling rate of 2 kHz. The reference is incorporated herein by reference. The analysis revealed peak lateral accelerations of 13 G during reaming, 2 G behind the positive displacement downhole motor, and 25 G while drilling through casing shoe. Accelerations in excess of 100 G were also reported when the BHA rotational speed matched the BHA's lateral resonant frequency. Accelerations of that magnitude are frequently destructive.

From published data it is apparent that shocks in excess of 50 G are rare and are not considered within normal operating conditions. Therefore, the accuracy of a motion detection system under these infrequent conditions is not critical. However, the system should be able to recover from such severe shocks without lasting adverse effects.

Figure 12:
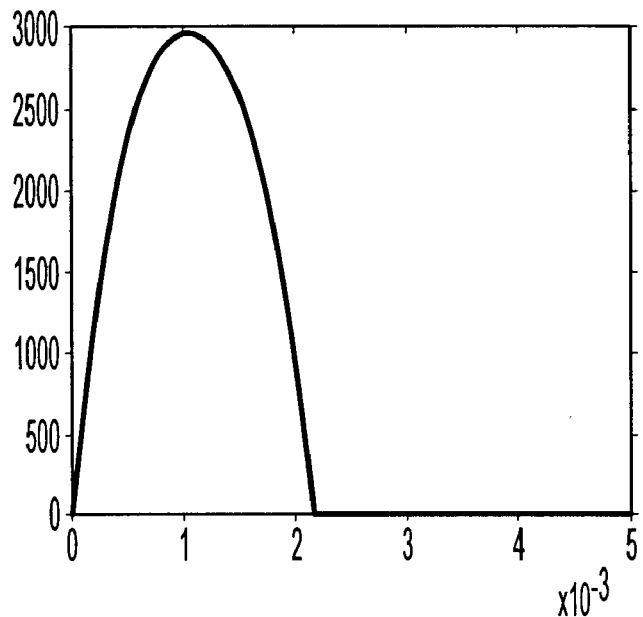
FIG. 12 is a graph of simulated accelerations during collision of the drill collar with a rigid barrier.
Figure 13:
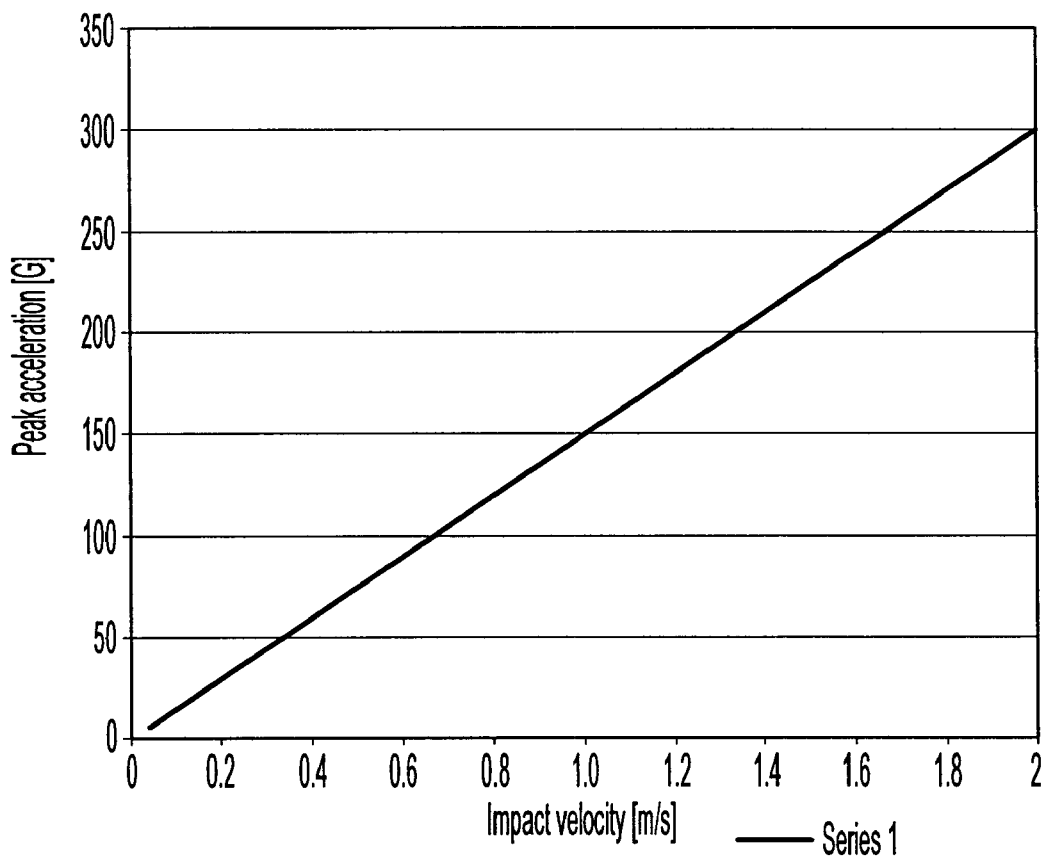
FIG. 13 is a graph of peak acceleration versus initial or impact velocity.

To estimate the acceleration magnitude and shape during collision of the tool with a borehole, a simple model was used, simulating a section of the drill collar colliding with a perfectly rigid barrier. The elasticity K was approximated based on the drill collar size and the material property. The simulated acceleration at the pipe's center is shown in FIG. 12. The pulse duration is independent of the initial velocity and is affected only by the pipe's properties. As shown in FIG. 13, the peak acceleration amplitude increases linearly with the initial velocity. This simulation of the collision can be considered a worst case since, in reality, the borehole fluid and crushing of the rock cushions the impact. Nonetheless, the simulated signal provides a good base to calculate the effect of bandwidth limitations on the accuracy of velocity.

TABLE 3

Velocity and 0.5 ms displacement errors vs. bandwidth (50 G maximum acceleration, simulated elastic collision)

| bandwidth (−3 Db) [Hz] | velocity error [m/s] | 0.5 ms displacement error [mm] |
|---|---|---|
| 200 | 0.604 | 0.297 |
| 500 | 0.369 | 0.18 |
| 1000 | 0.188 | 0.09 |
| 2000 | 0.093 | 0.045 |
| 5000 | 0.036 | 0.018 |

Figure 14:
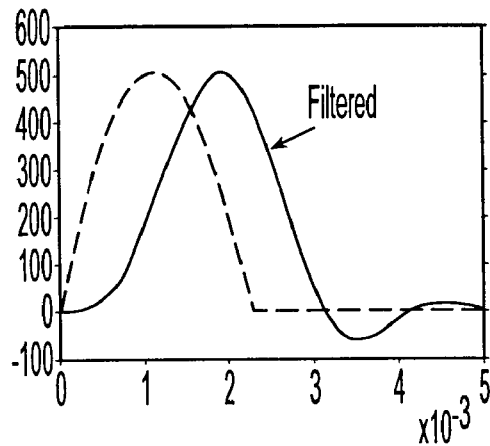
FIG. 14 is a graph of the effect of limited bandwidth on the acceleration signal after it passes through a 500 Hz low pass filter.
Figure 15:
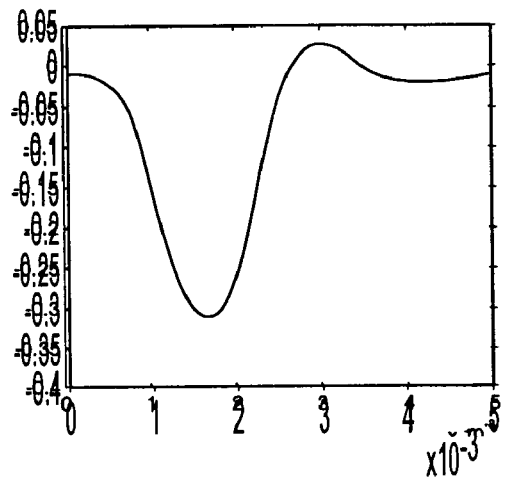
FIG. 15 is a graph of velocity error due to group delay of a low-pass filter.

FIG. 14 shows the acceleration signal after passing through a 500 Hz low-pass filter. The group delay of the filter causes a time shift between the input and output signals. Consequently, the calculated velocity will be loaded with an error as shown in FIG. 15. No post-processing can compensate for that group delay error and an accurate tool velocity in real-time cannot be obtained. Therefore, an adequate bandwidth for the accelerometers, as well as for the input anti-aliasing filters are chosen in advance in accordance with a preferred embodiment. If, on the other hand, a correction of the NMR signal based on actual velocity is considered, then the group delay can be digitally compensated employing phase correctors.

Figure 16:
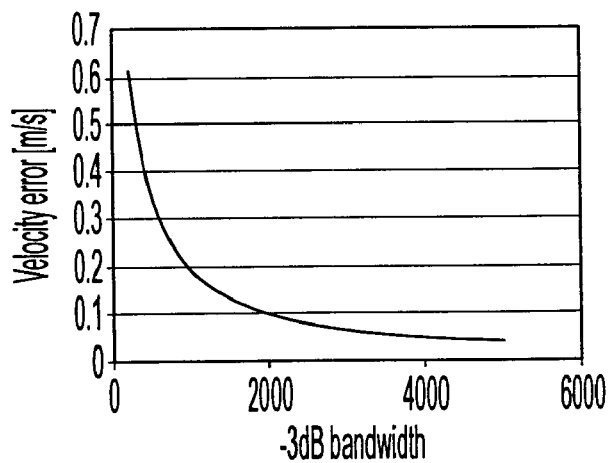
FIG. 16 is a graph depicting velocity error due to group delay vs. bandwidth.

Estimates provided in Table 3 and FIG. 16 indicate that a bandwidth of 4 kHz is required to assure a velocity measurement precision of 0.05 m/s during impacts of 50 G or, equivalently, as found in simulation, a 0.35 m/s impact velocity. The velocity error is proportional to peak acceleration during impact.

D. Uncertainty and Error Analysis

The accuracy of velocity calculations based on acceleration measurements are affected by both instrumental factors and motion characteristics. Some factors produce purely systematic errors, such as gain error, while others, despite their systematic character, are exhibited as semi-random errors owing to a randomizing effect of the conditions, for example, with bandwidth effect and quantization noise. Some factors, such as transducer noise are purely random. Owing to their dual nature, some uncertainty components may be described both statistically and as a worst case.

The effect of quantization noise can be approximated by a random noise with a variance of $1/12*q^2$, where q is the least square best fit value with a conversion resolution in m/s² Since $v_x$ and $v_y$ are integrated over the period T containing T/dT samples, with dT the sampling interval, the variance of the velocity is:

$$\sigma_{v_x}^2 = \sigma_{v_y}^2 = \frac{1}{2}\left(\frac{1}{12}q^2\right)dT^2\frac{T}{dT} = \left(\frac{1}{24}q^2\right)TdT \qquad (14)$$

The factor of ½ is a result of averaging the outputs of two accelerometers to obtain compensated acceleration signal (11). For a 14 bit+sign A/D converter and 50 G range, q is 0.03 m/s² Assuming a T of 2.5 seconds and a dT of 125 µs, the variance of the individual velocity components is 1.17*10⁻⁸, resulting in a standard deviation of 0.00011 m/s. To simplify the calculations, the variance of total velocity v, as described by Eq. (14), can be estimated to be less than $2\sigma^2 V_x$. The variance is proportional to velocity integration time and sampling interval and to the square of the A/D converter's resolution. Each additional bit reduces the standard deviation by a factor of 2.

The transducer noise at can be transformed the same way as the quantization noise according to the expression:

$$\sigma_{v_x}^2 = \sigma_{v_y}^2 = \frac{1}{2}\sigma_t^2 TdT \qquad (15)$$

except the input level is bandwidth dependent. Assuming a noise level of 1 mG/sqrt(Hz) using a Silicon Designs accelerometer having a bandwidth of 4 kHz, the input noise level can be estimated at 0.62 m/s² rms. Applying Eq. (15) and multiplying the result by 2 yields a velocity variance of 0.00012 m²/s² and a standard deviation of 0.011 m/s.

Any calibration error for the accelerometers will have a proportional effect on the calculated velocity. Since, over a long period of time, the average acceleration is zero, the effect of gain error is not cumulative. For any time period this error is proportional to the average acceleration for that time and the time duration. As a first approximation, the direct collision with the borehole wall may be analyzed. For the duration of the collision, the average acceleration is approximately 30 G and the pulse duration is 2.2 ms. The velocity error accumulated during the collision resulting from a 1% calibration error is 0.0065 m/s. The gain of the accelerometers can be initially calibrated to a measurement precision better than 0.5% using the earth's gravitational field as a reference.

Commercially available micro-machined silicone accelerometers have temperature coefficient of gain in the order of 2% over a 125° C. temperature span. This temperature behavior is repeatable so that compensation is possible. It is realistic to assume a net temperature coefficient after compensation to be less than 0.5%. Similarly, the resulting velocity error would be 0.0032 m/s.

The limited integration time results in an error dependent upon the degree of freedom the tool has in the borehole. The larger the borehole compared to the tool's diameter, the larger the error according to Eq. (11).

Any fluctuation of phase information used to compensate the gravitational field can cause a disturbance in the accelerometer information since the gravitational component is removed by subtracting the following term from equation (7):

$$G_{corr} = G\sin(\alpha_i)\sin(\varphi) \qquad (16)$$

The sensitivity of this correction factor to phase noise is:

$$S_\varphi^{G_{corr}} = \left|\frac{\partial G_{corr}}{\partial \varphi}\right| = G\sin(\alpha_i)\sin(\varphi) \qquad (17)$$

which peaks at $G\sin(\alpha_i)$. Consequently, the variance of the acceleration signal due to the phase noise is:

$$\sigma_a^2 \approx G^2\sin^2(\alpha_i)\sigma_q^2 \qquad (18)$$

Similarly as in Eq. (14) the resulting velocity variance due to phase noise is:

$$\sigma_a^2 = \sigma_{v_y}^2 = \frac{1}{2}(G^2\sin^2(\alpha_i)\sigma_\varphi^2)dT^2\frac{T}{dT} \qquad (19)$$

The noise approaches zero when $\alpha_i$ approaches zero, representing a perfectly vertical borehole.

Fluctuations of the phase signal come from magnetometer noise, external magnetic field disturbances and fluctuations of the tool's rotational axis in relation to the borehole axis. System problems occur from disturbances and fluctuations of the tool's axis in relation to the borehole axis. The use of magnetometers to detect phase is problematic when the direction of the borehole approaches the direction of the earth's magnetic field vector.

Since the phase is calculated as:

$$\varphi_m = -\arctan\left(\frac{B_y}{B_x}\right), -\frac{1}{2} \leq \frac{B_y}{B_x} \leq \frac{1}{2} \qquad (20)$$

the sensitivity of $\Phi_m$ to a $B_y$ disturbance is:

$$S_{B_y}^{\varphi_m} = \left|\frac{\partial \varphi_m}{\partial B_y}\right| = \frac{1}{B_x}\frac{1}{1+\left(\frac{B_y}{B_x}\right)^2} \qquad (21)$$

which assumes its lowest value of $1B_x$ when $B_y=0$. At this point, the value of $B_x$ is $\sin(\alpha_m)$, where $\alpha_m$ is the angle between the borehole and the earth's magnetic field vector. A symmetrical relationship exists for $B_x$ noise, but a reasonable estimate can be based on just one magnetic field component since the influence of one component peaks when the influence of the other is the lowest. The phase noise caused by the magnetic signal noise can be expressed as:

$$\sigma_\varphi^2 = \sigma_{\varphi_m}^2 \approx \sigma_{B_y}^2 \frac{1}{B_x^2} = \frac{\sigma_{B_y}^2}{B^2\sin^2(\alpha_m)} \qquad (22)$$

According to Eq. (22), the phase noise increases as $\alpha_m$ goes to 0, representing drilling along the earth's magnetic field vector. Combining Eq.(19) and Eq.(22) a formula linking magnetic field noise with velocity is derived:

$$\sigma_{v_x}^2 = \sigma_{v_y}^2 = \frac{1}{2}\left[G^2\sin^2(\alpha_i)\frac{\sigma_{b_y}^2}{B^2\sin^2(\alpha_m)}\right]dT^2\frac{T}{dT} \qquad (23)$$

$$= \frac{G^2\sin^2(\alpha_i)TdT}{2B^2\sin^2(\alpha_m)}\sigma_{b_y}^2$$

The noise of the magnetic induction signal has three uncorrelated components: (1) magnetometer noise, which is a function of the device used to measure the magnetic field;

(2) fluctuations of the tool's axis in relation to the earth's magnetic field; and (3) influence of the antenna-magnet. The noise of the magnetoresistive sensor, in this case a Honeywell HMC1002, for a bandwidth of 0.01–20 Hz, is under 6 $\mu$Gauss rms with a variation of $36*10^{12}$ Gauss$^2$.

The tool's axis is constrained by the borehole and, assuming a 30 ft distance between stabilizers and maximum 2 inch slack between the borehole wall and the stabilizer, as shown in FIG. 17, the maximum amplitude of $\beta$ is $2*\arctan(2"/30')=0.64°$. Assuming a uniform distribution of $\beta$ within $\pm\beta/2$ range, the variance of this distribution is $\beta^2/12$. For small $\beta$ the variance of $B_y$ due to the tool's axis fluctuations is:

$$\sigma_{B_y}^2 = B^2 \cos^2(\alpha_m) \sigma_\beta^2 \tag{24}$$

where the variance of $\beta$ is in radians$^2$.

The magnetic field generated by the NMR magnet may produce additional noise if the position of the magnet changes in relation to the magnetometer owing to the deformation of the tool's structure or the magnetometer's mounting. Only components within the 20 Hz bandwidth are significant since higher frequencies will be filtered out.

Figure 18:
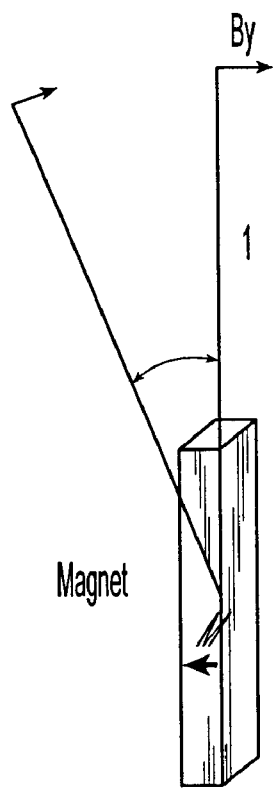
FIG. 18 illustrates NMR antenna magnet influence on magnetic sensor measurements.
Figure 19:
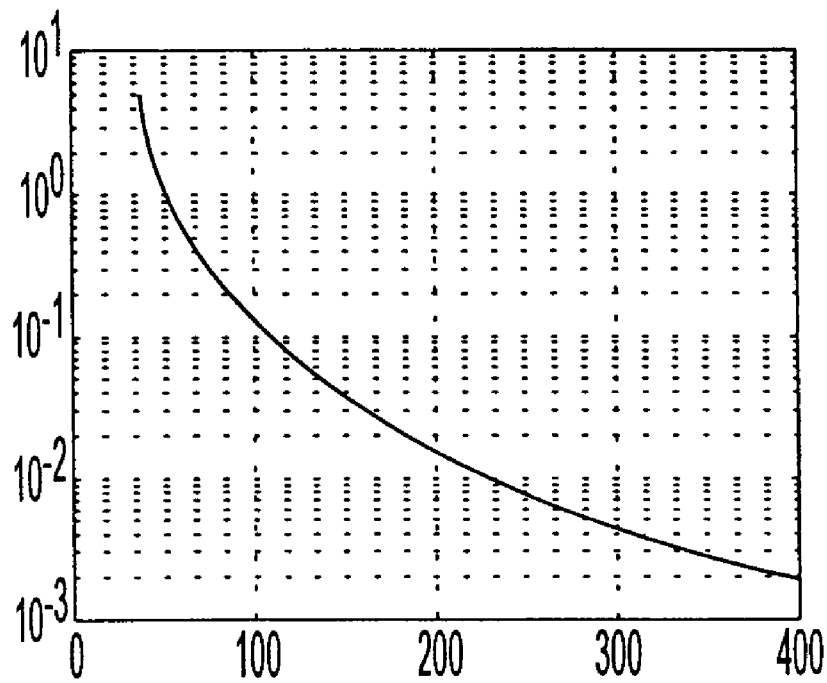
FIG. 19 is a graph of the relationship between the magnet-magnetometer distance and the $B_y$ component.

FIG. 18 illustrates the effect of the antenna magnet on the magnetic sensor measurements. When the magnetometer is on the magnet's axis it registers some $B_y$ field induced by the magnet. Magnet-induced components in other directions are zero in that configuration. FIG. 19 shows the relationship between the magnet-magnetometer distance and the $B_y$ component. At a distance of 70 inches, the magnet's field equals the earth's magnetic field. The distance L should be chosen such that the magnet's field, together with the earth's field, do not saturate the magnetometer at any moment. A distance of 100 inches appears adequate in the specific embodiment.

Figure 20:
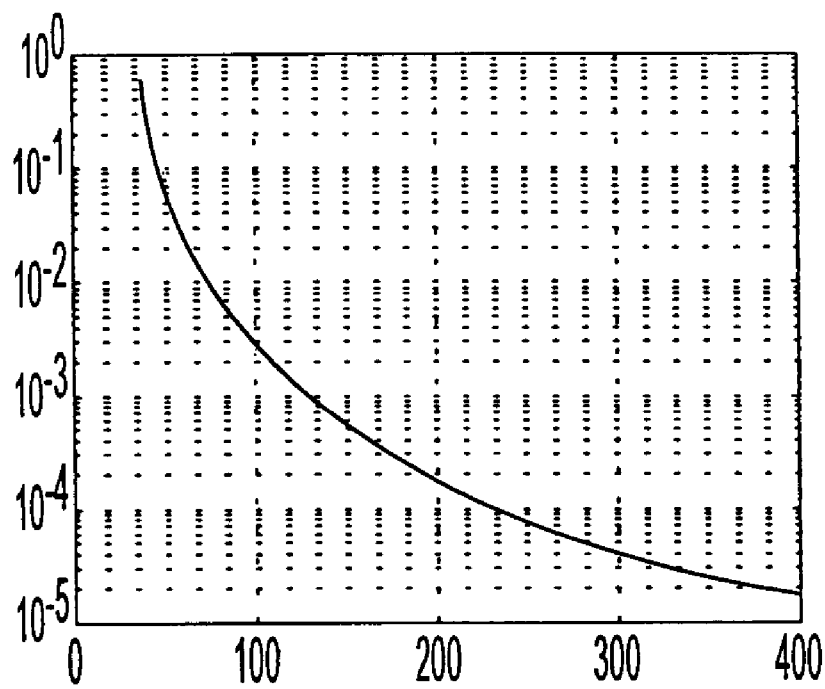
FIG. 20 is a graph showing the sensitivity of the $B_y$ magnetometer component versus deformation of the magnet-magnetometer assembly expressed in magnet-magnetometer distance.

When the tool is bent by an angle $\gamma$, the $B_y$ component will change slightly. FIG. 20 shows the sensitivity of the $B_y$ to $\gamma$ for up to a 1° deformation. Assuming a standard deviation of $\gamma$ not exceeding 1° the resulting $B_y$ variance is $1.9*10_{-9}$ Gauss$^2$. For the drill collar, the maximum specified bending radius is 18°/100 ft. At a distance of 100 inches the sensitivity is about 0.0025 Gauss/radian.

TABLE 4

Random error budget

| Source | Description | Uncertainty contribution [m/s 1σ] |
| --- | --- | --- |
| Quantization noise | 14 bit + sign A/D converter, ± 50 G range, 8 kHz sampling rate, 2.5 s averaging time | 0.0002 |
| Transducer noise | 4 kHz bandwidth and 6 mG/sqrt (Hz) noise level | 0.011 |
| Phase detection error (antenna magnet effect) | Magnetometer 100" from magnet's center, $\alpha_m > 1.50°$ | 0.03 |
| | Total (quadrature sum) | 0.032 |

TABLE 5

Random error budget

| Source | Description | Uncertainty contribution [m/s 1σ] |
| --- | --- | --- |
| Gain calibration error | A 50 G peak acceleration during a wall collision 2.2 ms long; 0.5% calibration error | 0.0032 |
| Gain temperature effect | As above, assuming 0.5% net gain change after compensation over the working temperature change | 0.0032 |
| High frequency cutoff | 4000 Hz bandwidth, maximum 50 G acceleration (see Table 3) | 0.05 |
| Limited integration time | Assuming 5 cm slack in the borehole and 2.5 s integration time (see formula (14)) | 0.02 |
| | Total (worst case) | 0.0764 |

Figure 21:
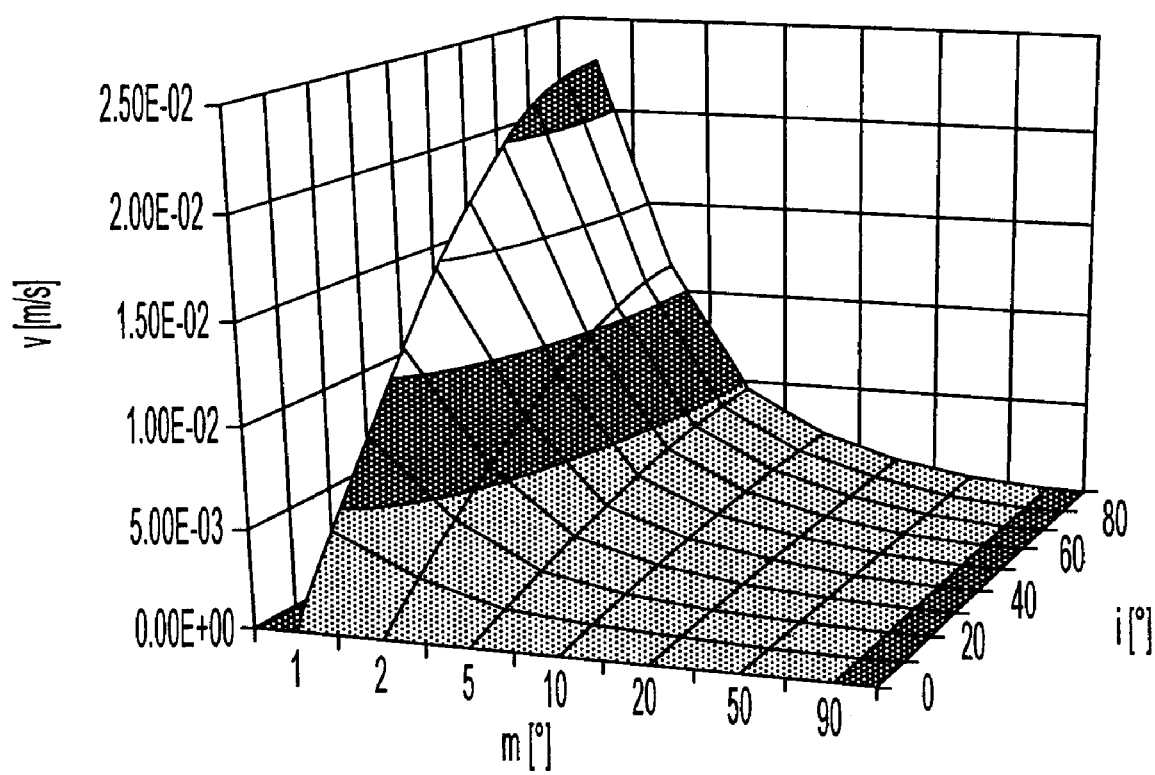
FIG. 21 is a graph of velocity uncertainty combining all three magnetometer-related effects.

A combined effect of all 3 magnetometer-related effects calculated according to (23) is shown in FIG. 21. The velocity uncertainty (1σ level) is below 0.015 m/s if the direction of the borehole is at least 1.5° apart from the direction of the earth's magnetic field vector. Otherwise, if the borehole direction is essentially parallel to the earth's field vector, the phase information has to be derived from the acceleration signals themselves.

Tables 4 and 5 summarize the uncertainty budget in accordance with a specific embodiment. It will be appreciated that the major contributor of random noise is the phase noise. The systematic error is dominated by the bandwidth limit. In accordance with the present invention, this error can be reduced in post processing by introducing phase correctors to reduce the group delay of the filters.

It will be readily apparent to those skilled in the art that various modifications may be made without departing from the spirit and scope of the invention. The scope of the invention shall not be limited to the embodiments described in the specification but shall be defined by the claims as appended.

What is claimed is:

1. An apparatus for making borehole measurements using a logging tool, comprising:

at least two accelerometers attached to the tool measuring motion parameters of the tool in a borehole to produce measurement data from which radial and tangential acceleration components can be derived, the motion parameters being measured in a tool reference frame;

two or more magnetic induction sensors attached to the tool measuring magnetic induction dependent on the orientation of said accelerometers in relation to the gravitational field; and a processor computing the motion parameters of the tool in a borehole reference frame based on measurements from said accelerometers and said magnetic induction sensors by taking into account the orientation of said accelerometers in relation to the gravitational field.

2. The apparatus of claim 1, wherein said at least two accelerometers measure the parameters $a_{r1}$, $a_{r2}$, $a_{t1}$, $a_{t2}$. where $a_{ri}$ is the radial acceleration component of the i-th accelerometer and $a_{tj}$ is the tangential acceleration component of the j-th accelerometer.

3. The apparatus of claim 2 having two orthogonal magnetic induction sensors.

4. The apparatus of claim 3, wherein the two orthogonal magnetic induction sensors measure the quantities:

$$B_x = B \sin(\alpha_m)\cos(\Omega_m)$$

$$B_y = -B \sin(\alpha_m)\sin(\Omega_m)$$

where B is the amplitude of the magnetic induction signal, x and y are coordinates in the borehole reference frame, $\alpha_m$ is the angle between the tool axis and the earth's magnetic field vector, and $\Omega_m$ is the phase of the tool's rotation in the earth's magnetic field which phase can be measured directly from $B_x$ and $B_y$.

5. The apparatus of claim 4 further comprising means for computing the instantaneous phase of the tool $\Omega$ and the quantity $G \sin(\alpha)$, where G is the acceleration of the earth's gravitational field and $\alpha$ is the angle between the tool's axis and the earth's gravity vector.

6. The apparatus of claim 5, wherein said means for computing the instantaneous phase of the tool $\phi$ comprises a quadrature detection system multiplying the sine and cosine of the magnetic phase $\phi_m$ with the measured acceleration yielding the difference between magnetic and gravitational phase.

7. The apparatus of claim 6, wherein said means for computing the instantaneous phase of the tool $\phi$ further comprises curve fitting means.

8. The apparatus of claim 5, wherein the processor computes the lateral acceleration parameters $a_x$ and $a_y$ of the tool in a borehole reference frame as follows:

$$a_x = \frac{(a_{r1} - a_{r2})\cos(\varphi) - (a_{t1} - a_{t2})\sin(\varphi)}{2}$$

$$a_y = \frac{(a_{r1} - a_{r2})\sin(\varphi) + (a_{t1} - a_{t2})\cos(\varphi)}{2}.$$

9. The apparatus of claim 8, wherein the processor computes lateral velocity parameters $v_x$ and $v_y$ of the tool on the borehole reference frame as follows:

$$v_x(t) = v_{0x} + \int_{T_0}^{t} a_x(t)dt$$

$$v_y(t) = v_{0y} + \int_{T_0}^{t} a_y(t)dt$$

where $v_{ox}$ and $v_{oy}$ are initial tool velocities at time $T_0$.

10. The apparatus of claim 9, wherein the processor computes the initial tool velocities $v_{ox}$ and $v_{oy}$ using the expression:

$$v_{0x} \approx -\frac{\int\int_{T_0}^{t} a_x(t)dt^2}{t - T_0}$$

$$v_{0y} \approx -\frac{\int\int_{T_0}^{t} a_y(t)dt^2}{t - T_0}.$$

11. The apparatus of claim 10, wherein the processor computes the amplitudes of the lateral tool velocity using the expression:

$$v = \sqrt{v_x^2 + v_y^2}.$$

12. The apparatus of claim 10, wherein the uncertainty of the measurement method is less than $\Delta s/(t-T_0)$, where $\Delta s$ is the distance between the tool and the walls of the borehole.

13. The apparatus of claim 1, wherein the logging tool is an NMR logging tool.

14. The apparatus of claim 13, wherein the motion parameters of the tool in the borehole reference frame are computed in real time.

15. The apparatus of claim 13, wherein the computed motion parameters of the tool in the borehole reference frame are used to determine optimal activation times for NMR measurements.

16. The apparatus of claim 13, wherein the computed motion parameters of the tool in the borehole reference frame are used to compensate NMR measurements for the motion of the tool.

17. The apparatus of claim 16, wherein the computed motion parameters of the tool in the borehole reference frame are used to discard NMR measurements made at lateral tool velocities in excess of 0.2 m/s.

18. The apparatus of claim 13, wherein the computed motion parameters of the tool in the borehole reference frame are used to calculate confidence intervals for different NMR measurements along the borehole.

19. The apparatus of claim 1, wherein said accelerometers are disposed diagonally opposite each other on the tool.

20. The apparatus of claim 1, wherein said two or more magnetic induction sensors measure magnetic field components that are perpendicular to the axis of the borehole.

21. A method for processing information from a tool having an apparatus in accordance with claim 1, the tool moving in a borehole within a geologic formation, comprising the steps of:

(a) sensing parameters of the tool motion using at least one accelerometer and at least one magnetometer;

(b) monitoring one or more of the following parameters: acceleration, magnetic phase, and temperature;

(c) comparing the monitored parameter(s) to standard operating parameters; and (d) generating a signal if one or more monitored parameters fall outside a predetermined range of operating values.

22. A method for making borehole measurements with a logging tool moving along a borehole subjected to a gravitational field, comprising:

(a) measuring motion parameters of the tool in a tool reference frame to produce measurement data from which radial and tangential acceleration components can be derived;

(b) estimating components of the measured motion parameters due to the gravitational field in the borehole;

(c) computing a set of corrected motion parameters, the step of computing comprising removing the estimated components due to the gravitational field; and (d) providing at least one measurement along the borehole with the logging tool, said at least one measurement taking into account the computed set of corrected motion parameters.

23. The method of claim 22, wherein step (a) comprises measuring the parameters $a_{r1}$, $a_{r2}$, $a_{t1}$, $a_{t2}$, where $a_{ri}$ is the i-th measured radial acceleration component, and $a_{ti}$ is i-th measured tangential acceleration component.

24. The method of claim 22 wherein components of the measured motion parameters due to the gravitational field in the borehole are estimated using two orthogonal magnetic induction sensors.

25. The method of claim 24, wherein the two orthogonal magnetic induction sensors measure the quantities:

$$B_x = B\sin(\alpha_m)\cos(\phi_m)$$

$$B_y = -B\sin(\alpha_m)\sin(\phi_m)$$

where B is the amplitude of the magnetic induction signal, x and y are coordinates in the borehole reference frame, $\alpha_m$ is the angle between the tool axis and the earth's magnetic field vector and $\phi_m$ is the phase of the tool's rotation in the earth's magnetic field which phase can be measured directly from $B_x$ and $B_y$.

26. The method of claim 24 further comprising the step of computing the instantaneous phase of the tool $\phi$.

27. The method of claim 26 further comprising the step of computing the gravitational field component $G\sin(\alpha)$, where G is the acceleration of the earth's gravitational field and $\alpha$ is the angle between the tool's axis and the earth's gravity vector.

28. The method of claim 26, wherein in step (c) lateral acceleration parameters $a_x$ and $a_y$ of the tool in the borehole reference frame are computed as follows:

$$a_x = \frac{(a_{r1} - a_{r2})\cos(\varphi) - (a_{t1} - a_{t2})\sin(\varphi)}{2}$$

$$a_y = \frac{(a_{r1} - a_{r2})\sin(\varphi) + (a_{t1} - a_{t2})\cos(\varphi)}{2}.$$

29. The method of claim 28, wherein in step (c) lateral velocity parameters $v_x$ and $v_y$ of the tool in the borehole reference frame are computed as follows:

$$v_x(t) = v_{0x} + \int_{T_0}^{t} a_x(t)dt$$

$$v_y(t) = v_{0y} + \int_{T_0}^{t} a_y(t)dt$$

where $v_{ox}$ and $v_{oy}$ are initial tool velocities at time $T_0$.

30. The method of claim 29, wherein the initial tool velocities $V_{ox}$ and $V_{oy}$ are computed using the expression:

$$v_{0x} \approx -\frac{\int\int_{T_0}^{t} a_x(t)dt^2}{t - T_0}$$

$$v_{0y} \approx -\frac{\int\int_{T_0}^{t} a_y(t)dt^2}{t - T_0}.$$

31. The method of claim 30, wherein the amplitude of the lateral tool velocity is computed as follows:

$$v = \sqrt{v_x^2 + v_y^2}.$$

32. The method of claim 22, wherein the measurement in step (d) is an NMR measurement.

33. The method of claim 22, wherein steps (a), (b), (c) and (d) are performed in real time.

34. The method of claim 32, wherein the computed motion parameters of the tool in the borehole reference frame are used to determine optimal activation times for NMR measurements.

35. The method of claim 32, wherein in step (d) the corrected motion parameters are used to compensate NMR measurements for the motion of the tool.

36. The method of claim 32, wherein in step (d) the corrected motion parameters are used to calculate confidence intervals for different NMR measurements along the borehole.

37. The method of claim 35, wherein in step (d) the corrected motion parameters are used to discard NMR measurements made at lateral tool velocities greater than about 0.2 m/s.

38. The method of claim 26, wherein the step of computing the instantaneous phase of the tool $\phi$ comprises a quadrature detection system multiplying the sine and cosine of the magnetic phase $\phi_m$ with the measured acceleration yielding the difference between magnetic and gravitational phase.

39. The method of claim 26 further comprising the steps of:
(a) computing $\phi_m$ as $-\text{atan2}(B_y, B_x)$; and
(b) determining constant phase shift $\phi_o$; and calculating $\phi$ according to the relation $\phi = \phi_m + \phi_o$.

* * * * *